United States Patent
Unsal

(10) Patent No.: US 10,140,277 B2
(45) Date of Patent: Nov. 27, 2018

(54) SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS

(71) Applicant: Intuit Inc., Mountain View, CA (US)

(72) Inventor: Cem Unsal, Alameda, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/292,510

(22) Filed: Oct. 13, 2016

(65) Prior Publication Data

US 2018/0018310 A1    Jan. 18, 2018

Related U.S. Application Data

(60) Provisional application No. 62/362,688, filed on Jul. 15, 2016.

(51) Int. Cl.
| | |
|---|---|
| *G06F 17/00* | (2006.01) |
| *G06F 17/24* | (2006.01) |
| *G06N 99/00* | (2010.01) |
| *G06Q 40/00* | (2012.01) |

(52) U.S. Cl.
CPC ........ *G06F 17/243* (2013.01); *G06N 99/005* (2013.01); *G06Q 40/123* (2013.12)

(58) Field of Classification Search
CPC .................................................. G06F 17/243
See application file for complete search history.

(56) References Cited

U.S. PATENT DOCUMENTS

| | | | | |
|---|---|---|---|---|
| 7,092,922 | B2 * | 8/2006 | Meng | G06N 3/08 700/47 |
| 7,254,569 | B2 * | 8/2007 | Goodman | G06F 17/243 |
| 7,343,551 | B1 * | 3/2008 | Bourdev | G06F 17/243 715/224 |
| 7,500,178 | B1 | 3/2009 | O'Donnell | |
| 7,561,734 | B1 | 7/2009 | Wnek | |
| 8,032,822 | B1 | 10/2011 | Artamonov et al. | |
| 8,370,143 | B1 * | 2/2013 | Coker | G06F 17/276 704/240 |

(Continued)

FOREIGN PATENT DOCUMENTS

| | | |
|---|---|---|
| JP | 2013-164740 | 8/2013 |
| WO | WO 2009-061917 | 5/2009 |

*Primary Examiner* — Amelia Tapp
(74) *Attorney, Agent, or Firm* — Hawley Troxell Ennis & Hawley LLP; Philip McKay

(57) ABSTRACT

A method and system learns new forms to be incorporated into an electronic document preparation system. The method and system receive form data related to a new form having a plurality of data fields that expect data values based on specific functions. The method and system gather training set data including previously filled forms having completed data fields corresponding to the data fields of the new form. The method and system group the training set data into groups and sample the groups. The method and system utilize machine learning in conjunction with the sampled training set data to identify an acceptable function for each of the data fields of the new form. The grouped and sampled training set data can also be passed to a quality assurance system.

31 Claims, 4 Drawing Sheets

(56) References Cited

U.S. PATENT DOCUMENTS

| | | |
|---|---|---|
| 8,756,489 B2 | 6/2014 | Richardt et al. |
| 9,069,745 B2 | 6/2015 | Jacobsen et al. |
| 9,430,453 B1 | 8/2016 | Ho |
| 9,652,562 B2 | 5/2017 | Barrus |
| 2003/0026459 A1 | 2/2003 | Won et al. |
| 2003/0233296 A1 | 12/2003 | Wagner |
| 2004/0039988 A1 | 2/2004 | Lee et al. |
| 2005/0125746 A1 | 6/2005 | Viola et al. |
| 2005/0257148 A1 | 11/2005 | Goodman et al. |
| 2006/0062451 A1 | 3/2006 | Li et al. |
| 2006/0155539 A1 | 7/2006 | Chen et al. |
| 2006/0178961 A1 | 8/2006 | Stanley et al. |
| 2006/0184870 A1 | 8/2006 | Christen et al. |
| 2007/0130134 A1 | 6/2007 | Ramsey et al. |
| 2008/0065634 A1 | 3/2008 | Krinsky |
| 2008/0104506 A1 | 5/2008 | Farzindar |
| 2008/0147528 A1 | 6/2008 | Talan et al. |
| 2008/0154824 A1 | 6/2008 | Weir et al. |
| 2008/0227075 A1 | 9/2008 | Poor et al. |
| 2008/0313174 A1 | 12/2008 | Barve et al. |
| 2009/0089046 A1 | 4/2009 | Uchimoto et al. |
| 2009/0119107 A1 | 5/2009 | Duncan |
| 2009/0204881 A1 | 8/2009 | Murthy et al. |
| 2009/0327513 A1 | 12/2009 | Guo et al. |
| 2010/0005096 A1 | 1/2010 | Minagawa et al. |
| 2011/0087671 A1 | 4/2011 | Lee et al. |
| 2011/0258182 A1 | 10/2011 | Singh et al. |
| 2011/0271173 A1 | 11/2011 | Ait-Mokhtar et al. |
| 2012/0272160 A1 | 10/2012 | Spivack et al. |
| 2013/0013612 A1 | 1/2013 | Fittges et al. |
| 2014/0019433 A1 | 1/2014 | Effrat et al. |
| 2014/0122988 A1 | 5/2014 | Eigner et al. |
| 2014/0173406 A1* | 6/2014 | Robelin ............... G06F 17/276 715/224 |
| 2014/0223277 A1 | 8/2014 | Kimber et al. |
| 2014/0258825 A1 | 9/2014 | Ghosh et al. |
| 2015/0046785 A1 | 2/2015 | Byron et al. |
| 2015/0095753 A1* | 4/2015 | Gajera ............... G06F 17/243 715/226 |
| 2015/0206067 A1 | 7/2015 | Abu-Mostafa et al. |
| 2015/0254225 A1 | 9/2015 | Chirca |
| 2015/0317295 A1 | 11/2015 | Sherry et al. |
| 2016/0019197 A1* | 1/2016 | Iasi ............... G06F 17/243 715/224 |
| 2017/0075873 A1* | 3/2017 | Shetty ............... G06F 17/243 |
| 2018/0018311 A1 | 1/2018 | Mukherjee et al. |
| 2018/0018322 A1 | 1/2018 | Mukherjee et al. |
| 2018/0018582 A1 | 1/2018 | Unsal et al. |
| 2018/0018676 A1 | 1/2018 | Mukherjee et al. |
| 2018/0018740 A1 | 1/2018 | Unsal et al. |
| 2018/0018741 A1 | 1/2018 | Mukherjee et al. |
| 2018/0032497 A1 | 2/2018 | Mukherjee et al. |
| 2018/0053120 A1 | 2/2018 | Mukherjee et al. |

* cited by examiner

SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS

RELATED CASES

This application is a Utility application from the U.S. provisional patent application filed Jul. 15, 2016 having Ser. No. 62/362,688, and entitled "SYSTEM AND METHOD FOR MACHINE LEARNING OF CONTEXT OF LINE INSTRUCTIONS FOR VARIOUS DOCUMENT TYPES," which is hereby incorporated herein by reference in its entirety as if the contents were presented herein directly.

BACKGROUND

Many people use electronic document preparation systems to help prepare important documents electronically. For example, each year millions of people use electronic tax return preparation systems to help prepare and file their tax returns. Typically, electronic tax return preparation systems receive tax related information from a user and then automatically populate the various fields in electronic versions of government tax forms. Electronic tax return preparation systems represent a potentially flexible, highly accessible, and affordable source of tax return preparation assistance for customers. However, the processes that enable the electronic tax return preparation systems to automatically populate various data fields of the tax forms often utilize large amounts of computing system and human resources.

For instance, due to changes in tax laws, or due to updates in government tax forms, tax forms can change from year to year, or even multiple times in a same year. If a tax form changes, or a new tax form is introduced, it can be very difficult to efficiently update the electronic tax return preparation system to correctly populate the various fields of the tax forms with the requested values. For example, a particular line of a newly adjusted tax form may request an input according to a function that requires values from other lines of the tax form and possibly values from other tax forms or worksheets. These functions range from very simple to very complex. Updating the electronic tax return preparation system often includes utilizing a combination of tax experts, software and system engineers, and large amounts of computing resources to incorporate the new form into the electronic tax return preparation system. This can lead to delays in releasing an updated version of the electronic tax return preparation system as well as considerable expenses. These expenses are then passed on to customers of the electronic tax return preparation system, as are the delays. Furthermore, these processes for updating electronic tax returns can introduce inaccuracies into the tax return preparation system.

These expenses, delays, and possible inaccuracies can have an adverse impact on traditional electronic tax return preparation systems. Customers may lose confidence in the electronic tax return preparation systems. Furthermore, customers may simply decide to utilize less expensive options for preparing their taxes.

These issues and drawbacks are not limited to electronic tax return preparation systems. Any electronic document preparation system that assists users to electronically fill out forms or prepare documents can suffer from these drawbacks when the forms are updated or new forms are released.

What is needed is a method and system that efficiently and accurately incorporates new forms into an electronic document preparation system.

SUMMARY

Embodiments of the present disclosure address some of the shortcomings associated with traditional electronic document preparation systems by providing methods and systems for efficiently learning functions for generating proper data values for data fields of a new form. Embodiments of the present disclosure utilize machine learning in conjunction with training set data to learn the functions. The training set data includes previously filled forms related to the new forms. Embodiments of the present disclosure divide the training set data into groups and then sample the training set data by selecting a relatively small number or of previously filled forms from each group. The sampled training set data is then used by the machine learning process to learn an acceptable function for a selected data field of the new form. The groups are selected such that certain types of uncommon or extreme examples from the training set are put into particular groups. Because the training set data is grouped in this manner, a relatively small number of previously filled forms can be sampled from each group without the risk leaving out uncommon but important examples from the training set data. Because a relatively small number of previously filled forms are sampled, embodiments of the present disclosure can perform the machine learning process in a very efficient manner. Embodiments of the present disclosure therefore provide an efficient system and method for learning and incorporating new forms into an electronic document preparation system.

In one embodiment, the electronic document preparation system includes a quality assurance system that tests the reliability of the electronic document preparation system. After the training set data has been grouped and sampled, the training set data can be provided to the quality assurance system. The quality assurance system can then feed the training set data into a currently operating electronic document preparation system or a document preparation system under test in order to determine the reliability of the electronic document preparation system. In particular, the quality assurance system generates quality test data by feeding the grouped and sampled training set data into the currently operating electronic document preparation system and comparing the data values in the data fields of the grouped and sampled training set data to the quality test data.

In one embodiment, an electronic document preparation system receives form data related to a new form that includes data fields to be completed in accordance with specific functions designated by the new form. The electronic document preparation system determines, for each selected data field of the new form, one or more possible dependencies for the selected data field and generates candidate functions for providing a proper data value for the data field. Embodiments of the present disclosure utilize machine learning to quickly and accurately determine an acceptable function needed to complete each data field of the form. Embodiments of the present disclosure gather training set data that includes previously filled forms related to the new form in order to assist in the machine learning process. The candidate functions can include one or more operators selected from a library or superset of operators. Embodiments of the present disclosure assign the previously filled forms to groups based on data values associated with the possible dependencies and based on the data fields of the previously filled forms corresponding to the data field that is currently being learned for the new form. The electronic document preparation system samples the training set data by selecting a relatively small number of previously filled forms from each group. The groups are selected so that even if a relatively small number of previously filled forms are sampled, uncommon but important examples and extreme examples from the training set data will be included in the machine learning process. The machine learning process applies the candidate functions to the sampled portion of the training set data in order to determine the accuracy of the candidate functions. For each data field, embodiments of the present disclosure generate and apply candidate functions in successive iterations until a candidate function is found that produces test data that matches the data values in the corresponding completed data fields of the previously filled forms of the training set data within a selected tolerance.

In one embodiment, the dependencies for a given data field of the new form can include data values from one or more other data fields of the new form. In one embodiment, the dependencies for a given data field of the new form can include data values from other data fields of one or more other forms or worksheets. In one embodiment, the dependencies can include one or more constants.

In one embodiment, the training set data is grouped and sampled for each candidate function. When a new candidate function is generated, the candidate function may have one or more different operators one or more different dependencies. Accordingly, it can be advantageous to generate new groups based on categories pertinent to the operators and dependencies in the current candidate function.

In one embodiment, the grouping process includes removing previously filled forms for which the data values of the dependencies in the candidate function are duplicated. In this way, a large portion of the training set data can be filtered before the sampling occurs.

In one embodiment, the sampled training set data includes not only the previously filled forms that were selected in the sampling process, but also the various data that was used to fill the previously filled forms. This data can include other types of forms, other worksheets, personal or financial data provided by a person for whom the previously filled form was filled, or other types of data relevant to generating data values for the data fields of the previously filled form. Thus, during the machine learning process, the candidate functions can include dependencies for a selected data field that include data values that are not found in the previously filled forms, but that were used to generate data values for the previously filled forms.

In one embodiment, the groups are based on respective signs of data values in the multiple data fields. In one example, a candidate function for a selected data field of the new form includes as dependencies a data value from a first line of the form and a data value from a second line of the form. In the training set data, the data values for the first and second lines and for the data field corresponding to the selected data field can be positive, negative, or zero. There can be a group for which all three data values are positive, a group for which the first data value is positive and the second and third data values are negative, a group for which the first data value is positive, the second data value is zero, and the third data value is positive, etc. There can be a respective group for each permutation represented within the training set data with regards to the signs of the data values of the dependencies and the selected data field.

In one embodiment, the groups are based on magnitudes of data values in the multiple data fields. Continuing with the example above in which the candidate function includes a data value from the first line of the form and a data value from the second line of the form, there can be groups for the various permutations of relative magnitudes of the data values in the training set data. For example, there can be a group in which the first data value is greater than the second data value and the second data value is greater than the third data value. There can be a group for which the first data value is less than the second data value and the second data value is less than the third data value. There can be a respective group for each permutation represented but in the training set data with regards to the relative magnitude of the data values of the dependencies and the selected field.

In one embodiment, the groups are based on the relationships of the data values in the multiple data fields with one or more constants. Continuing with the example above in which the candidate function includes a data value from the first line of the form and a data value from the second line of the form, there can be groups for the various permutations of comparisons of the data values in the training set data to the one or more constants. For example, there can be a group in which the first data value is greater than a selected constant, the second data value is less than the selected constant, and the third data value is also less than the selected constant. There can be a respective group for each permutation represented in the training set data with regards to how the data values relate to one or more constants.

In one embodiment, the groups can be based on one or more of magnitudes of the data values, signs of the data values, and the relationships of the data values to one or more constants.

In one embodiment, after grouping and removing duplicate data value combinations, few enough data points remain that further sampling is unnecessary and all remaining data points can be used in the training set data for testing the candidate function.

In one embodiment, an acceptable function is a function that exactly matches the correct function for a selected data field of the new form as set forth in the new form. In one embodiment, an acceptable function is a function that nearly matches the correct function for the selected data field as indicated by the matching data. In one embodiment, a candidate function can be deemed to be an acceptable field if the matching data indicates that the test data matches the training set data within a selected error tolerance.

In one embodiment, the correct function for a given data field of the new form can include operators that operate on one or more of the dependencies in a particular manner. The operators can include arithmetic operators such as addition, subtraction, multiplication, or division operators. The operators can include exponential functions. The operators can include logical operators such as if-then operators. The operators can include existence condition operators that depend on the existence of a data value in another data field of new form, in a form other than the new form, or in some other location or data set. The operators can include string comparisons. The operators can include rounding or truncating operations.

In one embodiment, the machine learning process is able to generate and test thousands of candidate functions very rapidly in successive iterations. The machine learning process can utilize one or more algorithms to generate candidate functions based on the one or more possible dependencies and other factors. The machine learning process can generate new candidate functions based on previously tested candidate functions that trended toward being a better match for the test data set.

In one embodiment, the machine learning process can generate and test a selected number of candidate functions and then generate results data that indicates how closely the candidate functions matched the training set data. The machine learning process can stop and await input from an expert or other personnel indicating that an acceptable function has been found or that further candidate functions should be generated and tested. The results data can indicate candidate functions that are likely correct based on the matching data. Additionally, or alternatively, the results data can indicate only a certain number of the candidate functions that best matched the training set data. Additionally, or alternatively, the results data can indicate the results from all the candidate functions that were tested.

In one embodiment, the results data can indicate whether or not the test data exactly matches the training set data. For example, even if the results data indicates that the candidate function is an acceptable candidate function, the results data can indicate if the test data related to the candidate function exactly matches the training set data. In one embodiment, the results data can indicate that a candidate function is unacceptable candidate function only if the candidate function results in test data that exactly matches the training set data.

In one embodiment, the electronic document preparation system includes an electronic tax return preparation system. When a state or federal government introduces a new or updated tax form, the tax return preparation system utilizes machine learning in conjunction with training set data that includes historical tax related data including previously prepared tax returns in order to quickly and efficiently learn and incorporate the new or updated tax form into the tax return preparation system. The tax return preparation system generates, for each data field of the new or updated tax form, a plurality of candidate functions in order to find an acceptable function that provides the data requested for the data field. For each candidate function, previously prepared tax returns are assigned to groups and a relatively small number of tax returns are sampled from each group. The tax return preparation system applies the candidate functions to that portion of the historical tax related data that corresponds to the sampled previously prepared tax returns in order to find an acceptable function that provides data values that match the data values in the completed data fields of the sampled previously prepared tax returns of the historical tax return data. The historical tax return data can include historical tax returns that have been prepared and filed with a state or federal government. The historical tax return data can include historical tax returns that have been accepted by a state or federal government agency or otherwise validated. The historical tax return data can include additional forms, worksheets, and tax related data used to generate the data values for the data fields of the previously prepared tax returns.

In some cases, it may not be feasible to obtain relevant historical tax related data related to previously filed tax returns to assist in the machine learning process of a new tax form. In these cases, the training set data can include fabricated tax returns completed by professionals or other tax return preparation systems using real or fabricated financial data.

In one example related to learning an acceptable function for a single data field of a new tax form, the tax return preparation system generates a candidate function for a specific line of a new tax form. The tax return preparation system generates test data by applying the candidate function to the historical tax return data. In particular, the tax return preparation system applies the candidate function to the tax related data associated with each of a plurality of previously filled tax forms that are related to the new tax form. The test data includes a test value for the specific line for each of the previously filled forms. The tax return preparation system generates matching data that indicates the degree to which the test values match the actual data values in the specific line of each of the historical tax returns. If the test data matches the actual data values in the specific line of the historical tax returns beyond a threshold degree of accuracy, then the tax return preparation system concludes that the candidate function is correct or likely correct. The tax return preparation system generates results data indicating whether the candidate function is likely correct.

In one embodiment, the electronic document preparation system can include a financial document preparation system other than a tax return preparation system. The financial document preparation system can include an invoice preparation system, a receipt preparation system, a payroll document preparation system, or any other type of electronic document preparation system. Furthermore, principles of the present disclosure are not limited to electronic document preparation systems but can extend to other types of electronic document preparation systems that assist users in filling out forms or other types of documents.

Principles of the present disclosure can be extended to many situations other than, or in addition to, machine learning situations or electronic document preparation systems. As one example, principles of the present disclosure related to the grouping and sampling of training set data can be used for quality assurance systems. These quality assurance systems may be related or unrelated to electronic document preparation systems. Principles of the present disclosure can be extended to many other situations involving the grouping and sampling of data sets, as will be apparent to those of skill in the art in light of the present disclosure. All such other situations, embodiments, implementations, etc. related to principles of the present disclosure fall within the scope of the present disclosure.

Embodiments of the present disclosure address some of the shortcomings associated with traditional electronic document preparation systems that do not adequately and efficiently incorporate new forms. An electronic document preparation system in accordance with one or more embodiments provides efficient and reliable incorporation of new forms by grouping and sampling training set data to be used in a machine learning process in order to quickly and accurately learn an acceptable function for various data fields of the new forms. The various embodiments of the disclosure can be implemented to improve the technical fields of data processing, resource management, data collection, and user experience. Therefore, the various described embodiments of the disclosure and their associated benefits amount to significantly more than an abstract idea. In particular, by grouping and sampling the training set data and utilizing machine learning to learn and incorporate new forms in an electronic document preparation system, the electronic document preparation system can learn and incorporate new forms more efficiently.

Using the disclosed embodiments of a method and system for efficiently learning new forms in an electronic document preparation system, a method and system for efficiently learning new forms in an electronic document preparation system more accurately is provided. Therefore, the disclosed embodiments provide a technical solution to the long standing technical problem of efficiently learning and incorporating new forms in an electronic document preparation system.

In addition, the disclosed embodiments of a method and system for efficiently learning new forms in an electronic document preparation system are also capable of dynamically adapting to constantly changing fields such as tax return preparation and other kinds of document preparation. Consequently, the disclosed embodiments of a method and system for efficiently learning new forms in an electronic document preparation system also provide a technical solution to the long standing technical problem of static and inflexible electronic document preparation systems.

The result is a much more accurate, adaptable, and robust method and system for efficiently learning new forms in an electronic document preparation system, but thereby serves to bolster confidence in electronic document preparation systems. This, in turn, results in: less human and processor resources being dedicated to analyzing new forms because more accurate and efficient analysis methods can be implemented, i.e., fewer processing and memory storage assets; less memory and storage bandwidth being dedicated to buffering and storing data; less communication bandwidth being utilized to transmit data for analysis.

The disclosed method and system for efficiently learning new forms in an electronic document preparation system does not encompass, embody, or preclude other forms of innovation in the area of electronic document preparation system. In addition, the disclosed method and system for efficiently learning new forms in an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for efficiently learning new forms in an electronic document preparation system, does not encompass, and is not merely, an abstract idea or concept.

Figure 1:
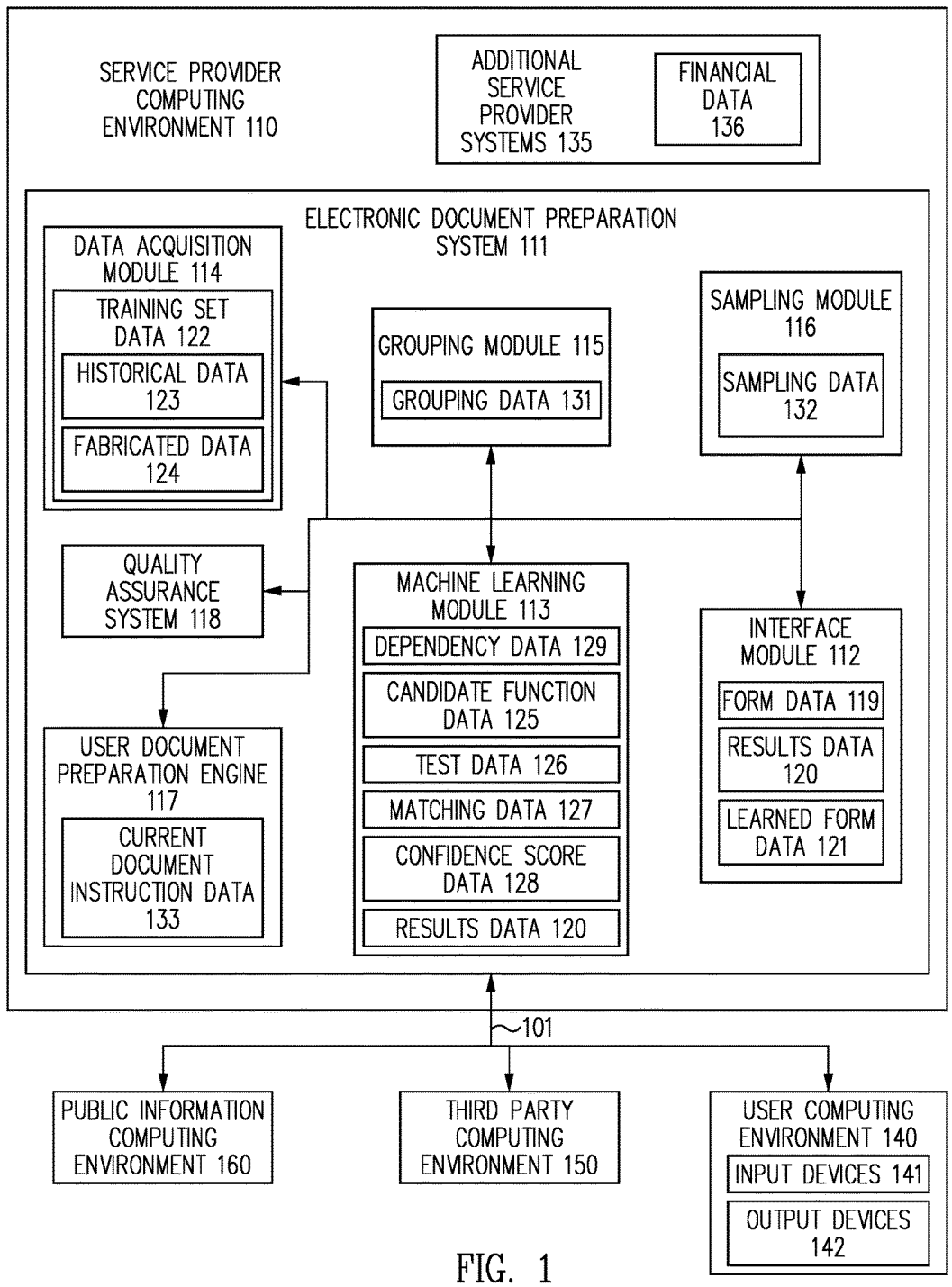
FIG. 1 is a block diagram of software architecture for efficiently learning new forms in an electronic document preparation system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed electronic document preparation system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for efficiently learning new forms in an electronic document preparation system, according to one embodiment. Embodiments of the present disclosure provide methods and systems for efficiently learning new forms in an electronic document preparation system, according to one embodiment. In particular, embodiments of the present disclosure receive form data related to a new form having data fields to be completed according to functions set forth in the new form and utilize machine learning in order to correctly learn the functions for each data field and incorporate them into the electronic document preparation system. Embodiments of the present disclosure gather training set data including previously filled forms related to the new form. Embodiments of the present disclosure generate, for each data field to be learned, dependency data that indicates one or more possible dependencies likely to be included in an acceptable function for the data field. Embodiments of the present disclosure utilize machine learning systems and processes to generate a plurality of candidate functions for each data field to be learned. The candidate functions are based on the one or more possible dependencies and can include one or more operators selected from a library of operators. The operators can operate on one or more of the possible dependencies. Embodiments of the present disclosure generate, for each candidate function, grouping data that separates the previously filled forms of the training set data into groups based on data values associated with the dependencies and the data field currently being learned. Embodiments of the present disclosure generate sampling data by selecting a relatively small number of previously filled forms from each group. The groups are selected so that uncommon variations and edge cases within the training set data will be represented even if only a small number of previously filled forms are selected from each group. Embodiments of the present disclosure generate test data for each candidate function by applying the candidate function to the training set data according to the sampling data. Embodiments of the present disclosure compare the test data to the data values in the corresponding data fields of the previously filled forms of the training set data. Embodiments of the present disclosure generate matching data indicating how closely the test data matches the values in the previously filled forms of the training set data. The machine learning processes can continue generating candidate functions and test data until a candidate function is found that provides test data that matches the completed fields of the training set data within a selected error tolerance. Embodiments of the present disclosure can generate results data that indicates acceptable functions for each data field of the new form. Embodiments of the present disclosure can output the results data for review by experts who can review and approve the acceptable functions. Additionally, or alternatively, embodiments of the present disclosure can determine when an acceptable candidate has been found or when the new form has been entirely learned and can incorporate the new form into a user document preparation engine so that users or customers of the electronic document preparation system can utilize the electronic document preparation system to electronically prepare documents using the new form. By utilizing advantageously grouped and sampled training set data for a machine learning process to learn and incorporate new forms, efficiency of the electronic document preparation system is increased.

In one embodiment, the grouping and sampling of training set data can be applied to circumstances other than electronic document preparation systems. Training set data of many kinds can be grouped and sampled as described herein in order to ensure that sampled training set data will represent extreme and uncommon examples from the training set data.

In one embodiment, training set data that has been grouped and sampled can be provided to a quality assurance system. The quality assurance system can use the grouped and sampled training set data to assure the quality of data processing systems of many kinds. Because rare and extreme examples from the training set data will be included in the sampled training set data, the quality assurance system can use a relatively small sampled training set data and still reliably check the quality of the data processing system.

In addition, the disclosed method and system for efficiently learning new forms in an electronic document preparation system provides for significant improvements to the technical fields of electronic financial document preparation, data processing, data management, and user experience.

In addition, as discussed above, the disclosed method and system for efficiently learning new forms in an electronic document preparation system provide for the processing and storing of smaller amounts of data, i.e., more efficiently analyze forms and data; thereby eliminating unnecessary data analysis and storage. Consequently, using the disclosed method and system for efficiently learning new forms in an electronic document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently learning new forms in an electronic document preparation system.

The production environment 100 includes a service provider computing environment 110, user computing environment 140, third party computing environments 150, and public information computing environments 160, for efficiently learning new forms in an electronic document preparation system, according to one embodiment. The computing environments 110, 140, 150, and 160 are communicatively coupled to each other with one or more communication channels 101, according to one embodiment.

The service provider computing environment 110 represents one or more computing systems such as a server, a computing cabinet, or distribution center that is configured to receive, execute, and host one or more electronic document preparation systems (e.g., applications) for access by one or more users, for efficiently learning new forms in an electronic document preparation system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes an electronic document preparation system 111, which is configured to provide electronic document preparation services to a user.

According to one embodiment, the electronic document preparation system 111 can be a system that assists in preparing financial documents related to one or more of tax return preparation, invoicing, payroll management, billing, banking, investments, loans, credit cards, real estate investments, retirement planning, bill pay, and budgeting. The electronic document preparation system 111 can be a tax return preparation system or other type of electronic document preparation system. The electronic document preparation system 111 can be a standalone system that provides financial document preparation services to users. Alternatively, the electronic document preparation system 111 can be integrated into other software or service products provided by a service provider.

The electronic document preparation system 111 assists users in preparing documents related to one or more forms that include data fields to be completed by the user. The data fields request data entries in accordance with specified functions. Once the electronic document preparation system has learned the functions that produce the requested data entries for the data fields, the electronic document preparation system can assist individual users in electronically completing the form.

In many situations, such as in tax return preparation situations, state and federal governments or other financial institutions issue new or updated versions of standardized forms each year or even several times within a single year. Each time a new form is released, the electronic document preparation system 111 may need to learn the specific functions that provide the requested data entries for each data field in the new form. If these data fields are not correctly completed, there can be serious financial consequences for users. Furthermore, if the electronic document preparation system 111 does not quickly learn and incorporate new forms into the electronic document preparation system 111, users of the electronic document preparation system 111 may turn to other forms of financial document preparation services. In traditional electronic document preparation systems, new forms are learned and incorporated by financial professionals or experts manually reviewing the new forms and manually revising software instructions to incorporate the new forms. In some cases, this can be a slow, expensive, and unreliable system. Thus, the electronic document preparation system 111 in accordance with principles of the present disclosure advantageously utilizes machine learning in addition to training second data in order to quickly and efficiently learn the functions related to each data field of a form and incorporate them into the electronic document preparation system 111.

According to one embodiment, the electronic document preparation system 111 receives form data related to a new or updated version of a form. The electronic document preparation system 111 analyzes the form data and identifies data fields of the form. The electronic document preparation system 111 acquires training set data that is related to the new or updated version of the form. The training set data can include historical data related to previously prepared documents including copies of the form, or a related form, with completed data fields. The previously prepared documents can include previously prepared documents that have already been filed and approved with government or other institutions, or that were otherwise validated or approved. Additionally, or alternatively, the training set data can include fabricated data that includes previously prepared documents using fictitious data or real data that has been scrubbed of personal identifiers or otherwise altered. The electronic document preparation system 111 utilizes machine learning in combination with the training set data to learn the functions that provide the requested data entries for the data fields of the new form.

In one embodiment, the electronic document preparation system 111 can identify one or more possible dependencies for each data field to be learned. These possible dependencies can include one or more data values from other data fields of the new form, one or more data values from one or more related forms or worksheets, one or more constants, or many other kinds of possible dependencies that can be included in an acceptable function for a particular data field. The electronic document preparation system 111 can identify the one or more possible dependencies based on natural language parsing of the descriptive text included in the new form and related to the data field. The electronic document preparation system can identify one or more possible dependencies by analyzing software from previous electronic document preparation systems that processed forms related to the new form. The electronic document preparation system 111 can identify possible dependencies by receiving data from an expert, from a third party, or from another source.

In one embodiment, the electronic document preparation system 111 generates, for each data field to be learned, a plurality of candidate functions based on the one or more dependencies and including one or more operators from a library or superset of operators. The electronic document preparation system 111 generates test data by applying the candidate functions to the training set data. The electronic document preparation system 111 then generates matching data that indicates how closely the test data matches the previously completed data fields of the training set data. When the electronic document preparation system 111 finds a candidate function that results in test data that matches the training set data within a selected error tolerance, electronic document preparation system 111 can determine that the candidate function is an acceptable function for the particular data field of the new form.

In one embodiment, in order to more efficiently test each candidate function, the electronic document preparation system groups and samples the training set data for each candidate function. In particular, the electronic document preparation system 111 generates grouping data based on the data values of dependencies and the data values of the data fields of the previously filled forms that correspond to the data field currently being learned for the new form. The groups are selected so that previously filled forms with uncommon data values and previously filled forms with data values that are at the extremes will be assigned to particular groups. An electronic document preparation system 111 generates sampling data by selecting a relatively small number of previously filled forms from each group. This results in sampled training set data with a relatively small number of previously filled forms that nevertheless include previously filled forms with rare but important data values. In this way, when the candidate function is tested, the test data can be generated from the relatively small number of previously filled forms. Yet, in spite of the relatively small sample size, all types of relevant previously filled forms are presented. This provides greater confidence in the reliability of the matching data when a candidate function is indicated as a match because the candidate function will be accurate even for rare and extreme cases.

In one embodiment, the electronic document preparation system 111 can generate and output results data for review by an expert. The results data can include candidate functions that are determined to be acceptable functions for respective data fields of the new form. The electronic document preparation system 111 can request input from the expert to approve the candidate function. Additionally, or alternatively, the electronic document preparation system 111 can determine that the candidate function is correct and update the electronic document preparation system 111 without review or approval by an expert. In this way, the electronic document preparation system can learn and incorporate new or revised forms into an electronic document preparation system 111.

The electronic document preparation system 111 includes an interface module 112, a machine learning module 113, a data acquisition module 114, a grouping module 115, a sampling module 116, a user document preparation engine 117, and a quality assurance system 118, according to one embodiment.

The interface module 112 is configured to receive form data 119 related to a new form. The interface module 112 can receive the form data 119 from an expert, from a government agency, from a financial institution, or in other suitable ways. According to one embodiment, when a new form or new version of a form is released, an expert or other personnel of the electronic document preparation system 111 can upload an electronic version of the form to the interface module 112. The interface module 112 can also receive the form data in an automated manner such as by receiving automatic updates or in another way. The electronic version of the form is represented by the form data 119. The form data 119 can include a PDF document, an HTML document, an accessible PDF document, or other types of electronic document formats. The form data can include data related the data fields, limiting values, tables, or other data related to the new form and its data fields that will be useful in the machine learning process.

The interface module 112 can also output results data 120 indicating the results of a machine learning process for particular candidate functions. The interface module 112 can also output learned form data 121 related to the finalized learned functions of the new form. An expert can obtain and review the results data 120 and the learned form data 121 from the interface module 112. Results data 120 or other test data can also be utilized by an expert or an automated system to use for other purposes. For example: results data 120 or other test data can be used by electronic document preparation systems to test software instructions of the electronic document preparation system before making functionality associated with the software instructions available to the public.

The machine learning module 113 analyzes the form data 119 in order to learn the functions for the data fields of the new form and incorporate them into the electronic document preparation system 111. The machine learning module 113 generates the results data 120 and the learned form data 121.

In one embodiment, the machine learning module 113 is able generate and test thousands of candidate functions very rapidly in successive iterations. The machine learning module 113 can utilize one or more algorithms to generate candidate functions based on many factors. The machine learning module 113 can generate new candidate functions based on previously tested candidate functions. The machine learning module 113 can utilize analysis of the form data or other data to learn the likely components of the correct function for a particular data field and can generate candidate functions based on these likely components.

In one embodiment, the electronic document preparation system 111 uses the data acquisition module 114 to acquire training set data 122. The training set data 122 includes previously prepared documents for a large number of previous users of the electronic document preparation system 111 or fictitious users of the electronic document preparation system 111. The training set data 122 can be used by the machine learning module 113 in order to learn and incorporate the new form into the electronic document preparation system 111.

In one embodiment, the training set data 122 can include historical data 123 related to previously prepared documents or previously filled forms of a large number of users. The historical data 123 can include, for each of a large number of previous users of the electronic document preparation system 111, a respective completed copy of the new form or a completed copy of a form related to the new form. The completed copies of the form include data values in the data fields.

In one embodiment, the training set data 122 can include fabricated data 124. The fabricated data 124 can include copies of the new form that were previously filled using fabricated data. The fabricated data can include real data from previous users or other people but that has been scrubbed of personal identifiers or otherwise altered.

In one embodiment, the historical data 123 or the fabricated data 124 also includes all of the related data used to complete the forms and to prepare the historical document. The historical data 123 can include previously prepared documents that include or use the completed form and which were filed with or approved by a government or other institution. In this way, the historical data 123 can be assured in large part to be accurate and properly prepared, though some of the previously prepared documents will inevitably include errors. Typically, the functions for computing or obtaining the proper data entry for a data field of a form can include data values from other forms resources related to each other and sometimes complex ways. Thus, the historical data 123 can include, for each historical user in the training set data, a final version of a previously prepared document, the form that is related to the new form to be learned, other forms used to calculate the values for the related form, and other sources of data for completing the related form.

In one embodiment, the electronic document preparation system 111 is a financial document preparation system. In this case, the historical data 123 can include historical financial data. The historical financial data can include, for each historical user of the electronic document preparation system 111, information, such as, but not limited to, a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial document preparation system or in the preparation of financial documents such as a user's tax return, according to various embodiments.

In one embodiment, the data acquisition module 114 is configured to obtain or retrieve historical data 123 from a large number of sources. The data acquisition module 114 can retrieve, from databases of the electronic document preparation system 111, historical data 123 that has been previously obtained by the electronic document preparation system 111 from a plurality of third-party institutions. Additionally, or alternatively, the data acquisition module 114 can retrieve the historical data 123 afresh from the third-party institutions.

In one embodiment, the data acquisition module 114 can also supply or supplement the historical data 123 by gathering pertinent data from other sources including the third party computing environment 150, the public information computing environment 160, the additional service provider systems 135, data provided from historical users, data collected from user devices or accounts of the electronic document preparation system 111, social media accounts, and/or various other sources to merge with or supplement historical data 123, according to one embodiment.

The data acquisition module 114 can gather additional data including historical financial data and third party data. For example, the data acquisition module 114 is configured to communicate with additional service provider systems 135, e.g., a tax return preparation system, a payroll management system, or other electronic document preparation system, to access financial data 136, according to one embodiment. The data acquisition module 114 imports relevant portions of the financial data 136 into the electronic document preparation system 111 and, for example, saves local copies into one or more databases, according to one embodiment.

In one embodiment, the additional service provider systems 135 include a personal electronic document preparation system, and the data acquisition module 114 is configured to acquire financial data 136 for use by the electronic document preparation system 111 in learning and incorporating the new or updated form into the electronic document preparation system 111. Because the services provider provides both the electronic document preparation system 111 and, for example, the additional service provider systems 135, the service provider computing environment 110 can be configured to share financial information between the various systems. By interfacing with the additional service provider systems 135, the data acquisition module 114 can supply or supplement the historical data 123 from the financial data 136. The financial data 136 can include income data, investment data, property ownership data, retirement account data, age data, data regarding additional sources of income, marital status, number and ages of children or other dependents, geographic location, and other data that indicates personal and financial characteristics of users of other financial systems, according to one embodiment.

The data acquisition module 114 is configured to acquire additional information from various sources to merge with or supplement the training set data 122, according to one embodiment. For example, the data acquisition module 114 is configured to gather from various sources historical data 123. For example, the data acquisition module 114 is configured to communicate with additional service provider systems 135, e.g., a tax return preparation system, a payroll management system, or other financial management system, to access financial data 136, according to one embodiment. The data acquisition module 114 imports relevant portions of the financial data 136 into the training set data 122 and, for example, saves local copies into one or more databases, according to one embodiment.

The data acquisition module 114 is configured to acquire additional financial data from the public information computing environment 160, according to one embodiment. The training set data can be gathered from public record searches of tax records, public information databases, property ownership records, and other public sources of information. The data acquisition module 114 can also acquire data from sources such as social media websites, such as Twitter, Facebook, LinkedIn, and the like.

The data acquisition module 114 is configured to acquire data from third parties, according to one embodiment. For example, the data acquisition module 114 requests and receives third party data from the third party computing environment 150 to supply or supplement the training set data 122, according to one embodiment. In one embodiment, the third party computing environment 150 is configured to automatically transmit financial data to the electronic document preparation system 111 (e.g., to the data acquisition module 114), to be merged into training set data 122. The third party computing environment 150 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the electronic document preparation system 111 utilizes the machine learning module 113 to learn the data fields of the new form in conjunction with training set data 122. The machine learning module 113 generates a plurality of candidate functions for each data field of the new form to be learned and applies the candidate functions to the training set data 122 in order to find a candidate function that produces data values that match the corresponding data values in the completed data fields of the training set data 122. The machine learning module 113 can continue to generate new candidate functions until the machine learning module 113 finds a candidate function that, when applied to the training set data 122, produces data values that match the data values in the completed data fields of the training set data.

In one embodiment, the electronic document preparation system 111 identifies dependency data 129 including one or more possible dependencies for each data field to be learned. These possible dependencies can include one or more data values from other data fields of the new form, one or more data values from one or more related forms or worksheets, one or more constants, or many other kinds of possible dependencies that can be included in an acceptable function for a particular data field.

In one embodiment, the machine learning module 113 generates candidate functions based on the dependency data 129 and one or more operators selected from a library or superset of operators. The operators can include arithmetic operators such as addition, subtraction, multiplication, or division operators. The operators can include logical operators such as if-then operators. The operators can include existence condition operators that depend on the existence of a data value in another data field of new form, in a form other than the new form, or in some other location or data set. The operators can include string comparisons. Each candidate function can include one or more of the operators operating on one or more of the possible dependencies.

In one embodiment, the machine learning module 113 learns an acceptable function for the data fields one at a time. In other words, if the form data 119 indicates that a form has 10 data fields to be learned, the machine learning module 113 will begin by learning an acceptable function for a first data field of the new form. In particular, the machine learning module 113 will generate candidate function data 125 corresponding to a plurality of candidate functions for the first data field of the new form as represented by the form data 119.

The machine learning module 113 also receives training set data 122 from the data acquisition module 114. The training set data 122 includes data related to previously completed copies of the form to be learned or previously completed copies of a form closely related to the new form to be learned. In particular, the training set data 122 includes copies of the form that have a data entry in the data field that corresponds to the data field of the new form currently being analyzed and learned by the machine learning module 113. The training set data 122 also includes data that was used to calculate the data values in the data field for each copy of the form or for each copy of the related form, e.g. W-2 data, income data, data related to other forms such as tax forms, payroll data, personal information, or any other kind of information that was used to complete the copies of the form or the copies of the related form in the training set data 122. The machine learning module 113 generates test data 126 by applying each of the candidate functions to the training set data for the particular data field currently being learned. In particular, for each copy of the form or related form in the training set data 122, the machine learning module 113 applies the candidate function to the training set data related to that copy of the form in order to generate a test data value for the data field. Thus, if the training set data 122 includes 1000 completed copies of the new form or a related form, then machine learning module 113 will generate test data 126 that includes one test data value for the particular data field being analyzed for each of the thousand completed copies. In one embodiment, the machine learning module 113 then generates matching data 127 by comparing the test data value for each copy of the form to the actual data value from the completed data field of that copy of the form. The matching data 127 indicates how many of the test data values match their corresponding completed data value from the training set data 122. If the candidate function is correct, then the test data values will match the completed data values for nearly every copy of the form or related form in the training set data 122.

It is expected that the training set data 122 may include some errors in the completed data values for the data field under test. Thus, an acceptable function may result in test data 126 that does not perfectly match the completed data fields in the training set data 122. Thus, an acceptable function will result in test data that matches the training set data within an error tolerance. In one embodiment, the machine learning module 113 will continue to generate and test candidate functions until a candidate function has been found that results in test data that matches the training set data 122 within the error tolerance. When an acceptable function has been found for the first data field of the new form, the machine learning module 113 can repeat this process for the second data field of the new form to be learned. The machine learning module 113 can continue in this manner until an acceptable function for each data field of the new form has been found.

In one embodiment, the electronic document preparation system utilizes the grouping module 115 and the sampling module 116 to improve the efficiency of the machine learning process. In particular, in order to reduce the time and resources used by the machine learning module 113 in testing each candidate function, the grouping module 115 and the sampling module 116 operate to provide sampled training set data 122 to the machine learning module 113. The grouping module 115 and the sampling module 116 group and sample the training set data 122 in such a way that the machine learning module 113 can generate test data 126 for each candidate function by applying the candidate function to a relatively small portion of the training set data. The grouping module 115 and the sampling module 116 group and sample the training set data 122 in such a way that although the portion of the training set data 122 used by the machine learning module 113 to test a candidate function is small, uncommon and extreme examples from the training set data 122 are represented. This improves the accuracy that the machine learning process while also improving the efficiency of the machine learning process.

In one embodiment, the grouping module 115 generates grouping data 131 for each candidate function. In particular, the grouping data 131 includes a plurality of groups for various categories of the training set data 122. The categories are related to the data values of the various dependencies and the data values in data fields corresponding to the data field currently being learned for the new form. The grouping data 131 assigns previously filled forms from the training set data 122 to the various groups based on the data values of the dependencies and the data value of the data field corresponding to the data field currently being learned. The groups are selected so that some groups will correspond to uncommon combinations of data values and some groups will correspond to extreme combinations of data values. Other groups will correspond to more common combinations of data values.

In one embodiment, the grouping module 115 performs a uniquing operation by which only previously filled forms with unique combinations of the relevant data values are assigned to groups. The discarding of previously filled forms having duplicate combinations of the relevant data values can greatly reduce the number of previously filled forms assigned to the groups in the grouping data 131. In one example, if 500 previously filled forms in the training set data 122 include the same combination of data values for the dependencies and the data field, then only one of these 500 previously filled forms will be assigned to a group. The other 499 previously filled forms will be discarded.

In one embodiment, the groups of the grouping data 131 are based on respective signs of the data values relevant to the candidate function being tested. In one example, a candidate function for a selected data field of the new form includes as dependencies a data value from a first line of the form, and a data value from a second line of the form. In the training set data, the data values for the first and second lines and for the data field corresponding to the data field under test can be positive, negative, or zero. There can be a group for which all three data values are positive, a group for which the first data value is positive and the second and third data values are negative, a group for which the first data value is positive, the second data value is zero, and the third data value is positive, etc. There can be a respective group for each permutation represented within the training set data with regards to the signs of the data values of the dependencies and the selected data field. There can also be groups for various permutations in which one or more of the relevant data values is blank or otherwise not available.

In one embodiment, the groups of the grouping data 131 are based on magnitudes of data values in the multiple data fields. Continuing with the example above in which the candidate function includes a data value from the first line of the form and a data value from the second line of the form, there can be groups for the various permutations of relative magnitudes of the data values in the training set data. For example, there can be a group in which the first data value is greater than the second data value and the second data values greater than third data value. There can be a group for which the first data value is less than the second data value and the second data value is less than the third data value. There can be a respective group for each permutation represented but in the training set data with regards to the relative magnitude of the data values of the dependencies and the selected field.

In one embodiment, the groups of the grouping data 131 are based on the relationships of the data values in the multiple data fields with one or more constants. Continuing with the example above in which the candidate function includes a data value from the first line of the form and a data value from the second line of the form, there can be groups for the various permutations of comparisons of the data values in the training set data 122 to the one or more constants. For example, there can be a group in which the first data value is greater than a selected constant, the second data value is less than the selected constant, and the third data value is also less than the selected constant. There can be a respective group for each permutation represented in the training set data with regards to how the data values relate to a constant.

In one embodiment, the constants to be included in the groups are identified based on analysis of the form data 119. For example, a natural language parsing analysis of the form data 119 related to a selected data field may indicate that a particular constant is involved in a function for generating a data value for the selected data field. In this case, the grouping module 115 can generate grouping data 131 that includes the constant.

In one embodiment, the groups can be based on one or more of magnitudes and the data values, signs of the data values, and the relationships of the data values to one or more constants. The constant can be added into existing groups, or the grouping module 115 can generate grouping data 131 that includes new groups based on the constant.

In one embodiment, the sampling module 116 generates sampling data 132 by selecting a relatively small number of previously filled forms from each group represented by the grouping data 131. Even though a small number of previously filled forms are sampled, the portion of the training set data 122 represented by the sampling data 132 is highly effective for the machine learning process because the sampling data 132 includes previously filled forms from each group represented by the grouping data 131. The groups in the grouping data 131 are selected so that some groups include uncommon combinations of data values or extreme combinations of data values. Thus, while the sample size may be small, the sampling is ensured to include both rare and common combinations of data values because samples are taken from each group.

In one embodiment, some groups defined by the grouping data 131 may be very small. In the cases of very small groups, the sampling module 116 may generate sampling data 132 that includes every previously filled form in the very small groups. These groups could include fewer than 10 previously filled forms, or even only a single previously filled form. In these cases, the sampling data 132 may include every previously filled form in the group.

In one embodiment, the machine learning module 113 applies the candidate function only to that portion of the training set data 122 that corresponds to the sampling data 132. This may be a very small number of previously filled forms. Thus, the machine learning module 113 generates test data 126 that includes a relatively small number of test data values. The machine learning module 113 then generates matching data 127 by comparing the test data 126 to the corresponding data values in the portion of the training set data 122 that is represented by the sampling data 132. The machine learning module 113 generates and tests candidate functions until an acceptable function is found for a selected field of the new form. For each candidate function that is generated, the grouping module 115 generates grouping data 131 specific to that candidate function. Likewise, the sampling module 116 generates sampling data 132 for that specific candidate function.

In one embodiment, the sampled training set data includes not only the previously filled forms that were selected in the sampling process, the also the various data that was used to fill the previously filled forms. This data can include other types of forms, other worksheets, personal or financial data provided by a person for whom the previously filled form was filled, or other types of data relevant to generating data values for the data fields of the previously filled form. Thus, during the machine learning process, the candidate functions can include dependencies for a selected data field that include data values that are not found in the previously filled forms, but that were used to fill the previously filled forms.

In one embodiment, the machine learning module 113 generates and tests candidate functions one at a time. Each time the matching data 127 for a candidate function does not indicate that the candidate function is correct, the machine learning module 113 generates a new candidate function and tests the new candidate function. The machine learning module 113 can continue this process until the correct candidate function has been found. In this way, the machine learning module 113 generates a plurality of candidate functions sequentially for each data field under test.

In one embodiment, the machine learning module 113 can first generate a plurality of candidate functions and then test each of the candidate functions. If the matching data 127 indicates that none of the candidate functions is the correct candidate function, then the machine learning module 113 can generate a second plurality of candidate functions and apply them to the training set data 122. The machine learning module 113 can continue generating candidate functions and applying them to the training set data until an acceptable function has been found.

In one embodiment, the machine learning module 113 generates candidate functions in successive iterations based on one or more algorithms. The successive iterations can be based on whether the matching data indicates that the candidate functions are becoming more accurate. The machine learning module 113 can continue to make adjustments to the candidate functions in directions that make the matching data more accurate until an acceptable function has been found.

In one embodiment, the machine learning module 113 generates confidence score data 128 based on the matching data 127. The confidence score data 128 can indicate, for each candidate function, how confident the machine learning module 113 is that the candidate function is an acceptable function. The confidence score data 128 can be based on the matching data 127 and recurrence data.

In one embodiment, the machine learning module 113 generates results data 120. The results data 120 can include matching data 127 or confidence score data 128 for each candidate function that has been tested for particular data field of the new form to be learned. Alternatively, the results data 120 can include data indicating that one or more of the candidate functions is possibly correct based on the matching data 127 or the confidence score 128. Alternatively, the results data 120 can indicate that an acceptable function has been found. The results data 120 can also indicate what an acceptable function is. The results data 120 can be provided to the interface module 112. The interface module 112 can output the results data 120 to an expert or other personnel for review or approval.

In one embodiment, the machine learning module 113 outputs results data 120 indicating that a candidate function has been found that is likely correct. The results data 120 can indicate what the candidate function is, the matching data 127 or confidence score data 128 related to the candidate function, or any other information that will be useful for review by an expert. The machine learning module 113 can cause the interface module 112 to prompt an expert to review the results data 120 and to approve the candidate function as correct or to indicate that the candidate function is not correct and that the machine learning module 113 should continue generating candidate functions for the data field currently under test. The machine learning module 113 awaits input from the expert or other personnel approving the candidate function. If the candidate function is approved by the expert or other personnel, the machine learning module 113 determines that an acceptable function has been found and moves on to finding an acceptable function the next data field of the new form.

In one embodiment, the results data 120 can indicate whether or not the test data 126 related to a particular candidate function exactly matches the grouped and sampled training set data 122. For example, even if the results data 120 indicates that the candidate function is an acceptable candidate function, the results data 120 can specify whether or not the test data 126 related to the candidate function exactly matches the grouped and sampled training set data 122. In one embodiment, the results data 120 can indicate that a candidate function is an acceptable candidate function only if the candidate function results in test data 126 that exactly matches the grouped and sampled training set data training set data 122.

In one embodiment, the machine learning module 113 does not wait for the approval of an expert before determining that the correct candidate function test and found. Instead, when the machine learning module 113 determines that an acceptable function has been found based on the matching data, the confidence score data 128, or other criteria, the machine learning module 113 moves onto the next data field of the new form under test.

In one embodiment, when the machine learning module 113 has learned an acceptable function for each data field of the new form, then the machine learning module 113 generates learned form data 121. The learned form data 121 indicates that the new form has been learned. The learned form data 121 can also indicate what the acceptable functions are for each of the data fields of the new form. The interface module 112 can output the learned form data 121 for review or approval by expert. In one embodiment, once the expert or other personnel has approved the learned form data 121, the machine learning module 113 ceases analysis of the new form and awaits form data 119 related to another form to be learned.

In one embodiment, the financial preparation system 111 includes a user document preparation engine 117. The document preparation engine 117 is the engine that assists users of the electronic document preparation system 111 to prepare a financial document based on or including the newly learned form as well as other forms. The user document preparation engine 117 includes current document instructions data 133. The current document instructions data 133 includes software instructions, modules, engines, or other data or processes used to assist users of the electronic document preparation system 111 in electronically preparing a document.

In one embodiment, once the machine learning module 113 has fully learned acceptable functions for the data fields of a new form, the machine learning module 113 incorporates the newly learned form into the electronic document preparation system 111 by updating the current document instructions data 133. When the current document instructions data 133 has been updated to include and recognize the new form, then users of the electronic document preparation system can electronically complete the new form using the electronic document preparation system 111. In this way, the electronic document preparation system 111 quickly provides functionality that electronically complete the data fields of the new form as part of preparing a financial document.

In one embodiment, the user computing environment 140 is a computing environment related to a user of the electronic document preparation system 111. The user computing environment 140 includes input devices 141 and output devices 142 for communicating with the user, according one embodiment. The input devices 141 include, but are not limited to, keyboards, mice, microphones, touchpads, touchscreens, digital pens, and the like. The output devices 142 include, but are not limited to, speakers, monitors, touchscreens, and the like. The output devices 142 can display data related to the preparation of the financial document.

In one embodiment, the machine learning module 113 can also generate interview content to assist in a financial document preparation interview. As a user utilizes the electronic document preparation system 111 to prepare a financial document, the user document preparation engine 117 may guide the user through a financial document preparation interview in order to assist the user in preparing the financial document. The interview content can include graphics, prompts, text, sound, or other electronic, visual, or audio content that assists the user to prepare the financial document. The interview content can prompt the user to provide data, to select relevant forms to be completed as part of the financial document preparation process, to explore financial topics, or otherwise assist the user in preparing the financial document. When the machine learning module 113 learns an acceptable function for each data field of a form, the machine learning module 113 can also generate text or other types of audio or video prompts that describe the function and that can prompt the user to provide information that the user document preparation engine 117 will use to complete the form. Thus, the machine learning module 113 can generate interview content to assist in a financial document preparation interview.

In one embodiment, the machine learning module 113 updates the current document instructions data 133 once a new form has been entirely learned without input or approval of an expert or other personnel. In one embodiment, the machine learning module 113 updates the current document instructions data 133 only after an expert has given approval that the new form has been properly learned.

In one embodiment, the machine learning module 113 only learns the candidate function for selected fields of a new form. For example, the machine learning module 113 may be configured to perform machine learning processes to learn acceptable functions for certain types of data fields. Some types of data fields may not be as conducive to machine learning processes or for other reasons the machine learning module 113 may be configured to learn only particular data fields of a new form. In these cases, the machine learning module 113 will only learn certain selected data fields of the new form. In some cases, the machine learning module 113 may determine that it is unable to learn an acceptable function for one or more data fields after generating and testing many candidate functions for the one or more data fields. The results data 120 can therefore include data indicating that an acceptable function for a particular data field of the new form cannot be learned by the machine learning module 113.

In one embodiment, once the form data 119 has been provided to the electronic document preparation system 111, the expert or other personnel can input an indication of which data fields of the new form should be learned by the machine learning module 113. The machine learning module 113 will then only learn acceptable functions for those fields of the new form that have been indicated by the expert or other personnel. In one embodiment, the form data 119 can indicate which data fields the machine learning module 113 should learn. In this way, the machine learning module 113 only attempt to learn selected data fields of a new form.

In one embodiment, the correct function for a data field may be simple or complex. A complex function may require that multiple data values be gathered from multiple places within other forms, the same form, from a user, or in other locations. A complex function may also include mathematical relationships that will be applied to the multiple data values in complex ways in order to generate the proper data value for the data field. A function may include finding the minimum data value among two or more data values, finding the maximum data value among two or more data values, addition, subtraction, multiplication, division, exponential functions, logic functions, existence conditions, string comparisons, etc. The machine learning module 113 can generate and test complex candidate functions until an acceptable function has been found for a particular data field.

In one embodiment, new forms may include data fields that expect data values that are alphabetical such as a first name, a last name, a middle name, a middle initial, a company name, a name of a spouse, a name of a child, a name of a dependent, a home address, a business address, a state of residence, the country of citizenship, or other types of data values that are generally alphabetic. In these cases, an acceptable function may include a person, a lasting, a middle name, a middle initial, a company name, a name of a spouse, a name of a child, a name of a defendant, a home address, a business address, a state residence, the country citizenship, or other types of alphabetic data values as the case may be. The acceptable function can also include a location from which these alphabetic data values may be retrieved in other forms, worksheets, or financial related data otherwise provided by users or gathered from various sources. The forms may also include data fields that expect data values that are numeric by nature. These a values may include incomes, tax withholdings, Social Security numbers, identification numbers, ages, loan payments, interest payments, charitable contributions, mortgage payments, dates, or other types of data values that are typically numeric in nature.

In one embodiment, the machine learning module 113 can generate candidate functions for a particular data field by referring to the dependency data that can provide an indication of the types of data that are likely to be included in an acceptable function and their likely location in other forms or data. For example, the machine learning module 113 can utilize historical document instructions data, natural language parsing data, current document instruction data 133, and other types of contextual clues or hints in order to find a likely starting place for generating candidate functions. For this reason, the electronic document preparation system 111 can include a natural language parsing module and a historical form analysis module.

In one embodiment, the electronic document preparation system 111 includes a natural language parsing module analyzes the form data 119 with a natural language parsing process. In particular, the natural language parsing module analyzes the text description associated with each data field of the new form on the analysis. For example, the form data 119 may include text descriptions for the various data fields of the new form. The natural language parsing module analyzes these text descriptions and generates natural language parsing data indicating the type of data value expected in each data field based on the text description. The natural language parsing module provides the natural parsing data to the machine learning module 113. The machine learning module 113 generates candidate functions for the various data fields based on the natural language parsing data. In this way, the machine learning module 113 utilizes the natural language parsing data to assist in the machine learning process.

In one embodiment, the electronic document preparation system 111 includes a historical form analysis module that analyzes the form data 119 in order to determine if it is likely that previous versions of the electronic document preparation system 111 included software instructions that computed data values for data fields of historical forms that are similar to the new form. Accordingly, the historical form analysis module analyzes the historical document instruction data that includes software instructions from previous versions of the electronic document preparation system 111. Because it is possible that the previous versions of the electronic document preparation system utilized software languages or structures that are now obsolete, the historical document instructions data cannot easily or simply be analyzed or imported into the current document instructions data 133. For this reason, the historical form analysis module can analyze the historical document instructions data related to historical forms that are similar to the new form. Such historical forms may include previous versions of the new form. The historical form analysis module can identify from the outdated software language the correct or acceptable functions related to data fields of the historical forms and can generate historical instruction analysis data that indicates correct or acceptable functions for the previous version of the form. The machine learning module 113 can utilize these instructions in order to find a starting point for generating the candidate functions in order to learn the data fields of the new form.

In some cases, a new form may be nearly identical to a previous known version of the form. In these cases, the training set data 122 can include historical data 123 that relates to previously prepared, filed, or approved financial documents that included or based on the previous known form. In these cases, the data acquisition module 114 will gather a training set data 122 that includes a large number of previously completed copies of the previous version of the form. The machine learning module 113 generates the candidate functions and applies them to the training set data as described previously.

In some cases, a new form may include data fields that are different enough that no analogous previously prepared financial documents are available to assist in the machine learning process. In one embodiment, the data acquisition module 114 gathers training set data 122 that includes fabricated financial data 124. The fabricated financial data 124 can include copies of the new form prepared with fabricated financial data by a third-party organization or a processor system associated with the service provider computing environment 110. The fabricated financial data 124 can be used by the machine learning module 113 in the machine learning process for learning acceptable functions associated with the data fields of the new form. In such a case the machine learning module 113 generates candidate functions and applies them to the training set data 122 including the fabricated financial data 124 as described previously.

In one embodiment, the training set data 122 can include both historical data 123 and fabricated financial data 124. In some cases, the historical data 123 can include previously prepared documents as well as previously fabricated financial documents based on fictitious or real financial data.

In one embodiment, the data acquisition module 114 gathers new training set data 122 each time a new data field of the new form is to be analyzed by the machine learning module 113. The data acquisition module 114 can gather a large training set data 122 including many thousands or millions of previously prepared or previously fabricated financial documents. When a new data field of a new form is to be learned by the machine learning module 113, the data acquisition module 114 will gather training set data 122, or subset of the training set data 122, that includes a selected number of previously prepared financial documents that each have a data value in a data field of a form that corresponds to the data field of the new form that is currently being learned by the machine learning module 113. In some cases, the training set data 122 can include millions of previously prepared financial documents, not only a few hundred or thousands of the previously prepared documents are needed for analysis by the machine learning module 113. Thus, the data acquisition module 114 can gather training set data that is appropriate and efficient for the machine learning module 113 to use the learning the current data field of the new form.

In one embodiment, the electronic document preparation system 111 is a tax return preparation system. Preparing a single tax return can require many government tax forms, many internal worksheets used by the tax return preparation system in preparing a tax return, W-2 forms, and many other types of forms or financial data pertinent to the preparation of a tax return preparation system. For each tax return that is prepared for a user, the tax return preparation system maintains copies of all of the various tax forms, internal worksheets, data provided by the user and any other relevant financial data used to prepare the tax return. Thus, the tax return preparation system maintains historical tax return data related to millions of previously prepared tax returns. The tax return preparation system can utilize the historical tax return data to gather or generate relevant training set data 122 that can be used by the machine learning module 113.

In one embodiment, a state or federal agency releases a new tax form that is simply a new version of a previous tax form during tax return preparation season. an expert upload form data 119 to the interface module 112. The form data 119 corresponds to an electronic version of the new tax form. Many or all of the data fields of the new tax form may be similar to those of the previous tax form. The machine learning module 113 begins to learn the new tax form starting with a first selected data field of the new tax form. The first selected data field corresponds to a first selected line of the new tax form, not necessarily line 1 of the new tax form. The machine learning module 113 causes the data acquisition module 114 to gather training set data 122 that includes a large number of previously prepared tax returns and the tax related data associated with the previously prepared tax returns. In particular, the training set data 122 will include previously prepared tax returns that use the previous version of the new form. The machine learning module 113 generates a plurality of candidate functions for the first selected data field and applies them to the training set data 122. For each candidate function, the machine learning module 113 generates matching data 127 or confidence score data 128 indicating how well the test data 126 matches the training set data 122. The machine learning module 113 generates results data 120 indicating the matching data 127 or the confidence score data 128 of one or more of the candidate functions. The results data 120 can also indicate whether a candidate function is deemed to be an acceptable function for the first selected data field.

The machine learning module 113 moves onto a second selected data field after an acceptable function has been found for the first selected data field. The data fields correspond to selected lines of the new tax form. The machine learning module 113 continues in this manner until all selected data fields of the new tax form have been found. When all selected data fields of the new tax form have been learned, the machine learning module 113 generates learned form data 121 indicating that all selected fields of the new form have been learned. The interface module 112 can present results data 120 or learned form data 121 for review or approval by an expert or other personnel. Alternatively, the machine learning module 113 can move from one data field to the next data field without approval or review by an expert.

In one embodiment, the training set data 122 may include data related to millions of previously prepared tax returns. In order to improve the efficiency of the machine learning module 113, the tax return preparation system utilizes the grouping module 115 and the sampling module 116 to group and sample the training set data 122 to produce a training set that is both small and reliable based on the formation of the groups in the sampling from each group.

In one example, the new form is a tax form in which the instructions for line 5 of the tax form state: "If line 4a greater than $3000, then enter the values in line 4a, otherwise multiply line 3 by 10% and enter the result. If the values less than 0, enter 0." In this example, the value ranges for lines 3 and 4a are [0, 20,000] and all values are integers. The training set data 122 includes 20 k×20 k×3 k different combinations for the data values in lines 3, 4a, and 5. The machine learning module 113 generates a candidate function for line 5 that includes as dependencies the data values in lines 3 and 4a. The grouping module 115 generates grouping data 131 that includes a plurality of groups. The groups are based on the signs and the relative magnitudes of the data values in lines 3, 4a, and 5 and their relationships to the constant 3000.

TABLE 1

| Data Points [line 3, line 4a, line 5] | Group | Group Description |
|---|---|---|
| [2020, 1234, 202] | +++::3000>3>4a>5 | All positive, in decreasing order, all less than 3000 |
| [4013, 5008, 5008] | +++::3000<3<4a=5 | All positive, first value smaller than others which are equal, all greater than 3000 |
| [0, 1200, 0] | 0+0::3=5<4a<3000 | Second value positive, the rest are zero, all less than |

TABLE 1-continued

| Data Points [line 3, line 4a, line 5] | Group | Group Description |
|---|---|---|
| [345, 0, 35] | +0+::3000>3>5>4a | Second value zero, rest positive, last value less than first, all less than 3000 |
| [−600, 1250, 0] | −+0::3<5<4a<3000 | First value negative, second positive, last zero, all less than 3000 |

Table 1 shows an example of some possible groups and a combination of data values for lines 3, 4a, 5 that would be assigned to each group. Each set of data values in the data points column corresponds to data values in lines 3, 4a, and 5 of a particular previously filled tax form. The groups each correspond to various permutations of signs, relative sizes, and relationships of the data values to the constant 3000. In practice, many other groups can be included based on sign, relative magnitude of the data values, or other factors.

In one embodiment, the grouping module 115 may be configured to remove groups that have only a single data point. For example, in a very large training set data 122, there may be millions of previously prepared forms. Among these millions of previously prepared forms, there may be two or three that include errors related to the data field currently being analyzed. These erroneous previously prepared forms will be represented in the grouping. Most likely, each of these erroneous previously prepared documents will be represented as its own group of one in the grouping data 131. Thus, the grouping module 115 may be configured to eliminate groups that have only a single data point if the training set data 122 includes a very large number of data points to begin with because groups of one are likely to represent an error.

In one embodiment, after grouping and removing duplicate data value combinations, few enough data points remain that further sampling is unnecessary and all remaining data points can be used in the training set data for testing the candidate function.

In one embodiment, the tax return preparation system receives form data 119 corresponding to a new form for which an adequate previously known form cannot be found. In this case, the data acquisition module 114 gathers training set data that can include fabricated financial data 124. The fabricated financial data 124 can include fictitious previously prepared tax returns and the fabricated financial data that was used to prepare them. The data acquisition module 114 can obtain the fabricated financial data 124 from one or more third parties, one or more associated tax return preparation systems, or in any other way. For example, the tax return preparation system can generate fabricated financial data and provided to one or more third parties to prepare a fabricated tax return using the new tax form. The fabricated financial data can include data related to real users of the tax return preparation system, a script of actual identifiers such as real names, real Social Security numbers, etc. The third parties can then prepare tax returns from the fabricated financial data using the new form. The third parties can then provide the fabricated tax returns to the tax return preparation system. The tax return preparation system can then utilize the fabricated financial data 124 in conjunction with the machine learning module 113 to learn acceptable functions for the data fields of the new form.

In one embodiment, the machine learning module 113 can also generate confidence score data 128 indicating a level of confidence that the candidate function is correct. The machine learning module 113 generates results data 120 that indicate that the candidate function is likely an acceptable function. The interface module 112 outputs the results data 120 for review or approval by expert or other personnel. The expert or other personnel can approve the candidate function, causing the machine learning module 113 to move to the next selective line of the new tax form. Alternatively, the machine learning module 113 can decide that the candidate function is correct without approval from an expert or other personnel and can move onto the next selected line of the new tax form. If the matching data 127 indicates that the candidate function does not match the training set data well, then the machine learning module 113 generates one or more other candidate functions and generates test data 126 by applying the one or more candidate functions to the training set data 122 in the same way. The machine learning module 113 can continue to generate candidate functions in successive iterations until the correct candidate function has been found. The machine learning module 113 can continue from one line of the new tax form to the next until all selected lines of the tax form have been correctly learned by the machine learning module 113.

In one embodiment, when all selected lines of the new tax form have been learned, the machine learning module 113 generates learned form data 121 that indicates that the new tax form has been learned. The learned form data 121 can also include the acceptable for each selected line of the new tax form. The interface module 112 can output the learned form data 121 for review by an expert or other personnel.

In one embodiment, when the tax form has been learned by the machine learning module 113, the machine learning module 113 updates the current document instructions data 133 to include software instructions for completing the new tax form as part of the tax return preparation process.

Embodiments of the present disclosure address some of the shortcomings associated with traditional electronic document preparation systems that do not adequately learn and incorporate new forms into the electronic document preparation system. An electronic document preparation system in accordance with one or more embodiments provides more reliable financial management services by utilizing machine learning and training set data to learn and incorporate new forms into the electronic document preparation system. The various embodiments of the disclosure can be implemented to improve the technical fields of data processing, data collection, resource management, and user experience. Therefore, the various described embodiments of the disclosure and their associated benefits amount to significantly more than an abstract idea. In particular, by utilizing machine learning to learn and incorporate new forms in the electronic document preparation system, electronic document preparation system can more efficiently learn and incorporate new forms into the electronic document preparation system.

Process

Figure 2:
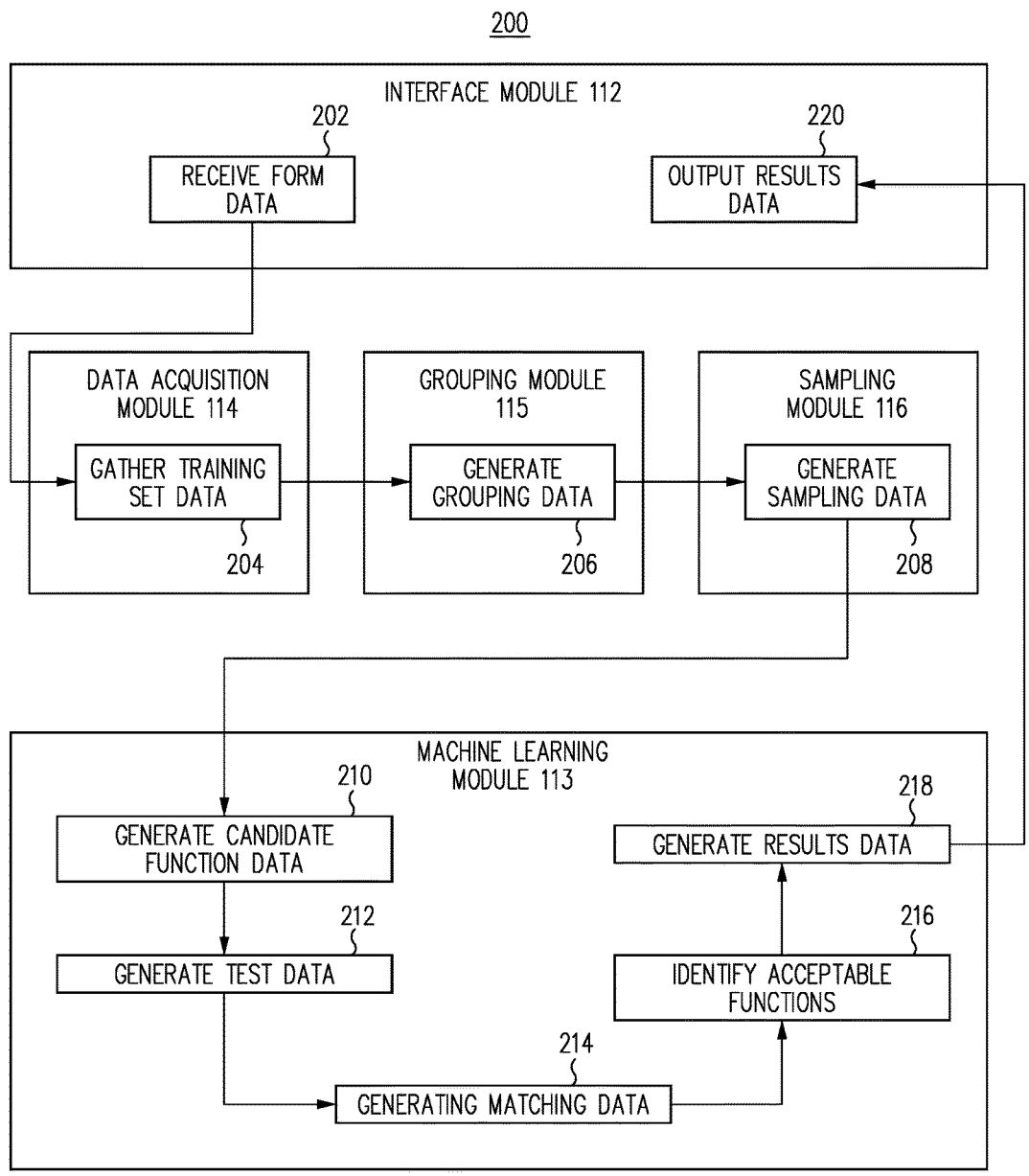
FIG. 2 is a block diagram of a process for efficiently learning new forms in an electronic document preparation system, in accordance with one embodiment.

FIG. 2 illustrates a functional flow diagram of a process 200 for efficiently learning new forms in an electronic document preparation system, in accordance with one embodiment.

At block 202 the interface module 112 receives form data related to a new form having a plurality of data fields that expect data values in accordance with specific functions, according to one embodiment. From block 202 the process proceeds to block 204.

At block 204 the data acquisition module 114 gathers training set data related to previously filled forms having completed data fields that each correspond to a respective data field of the new form, according to one embodiment. From block 204 the process proceeds to block 206.

At block 206 the grouping module 115 generates grouping data by assigning each of a plurality of previously filled forms from the training set data to groups, according to one embodiment. From block 206 the process proceeds to block 208.

At block 208, the sampling module 116 generates sampling data by selecting one or more previously filled forms from each of the groups, according to one embodiment. From block 208 the process proceeds to block 210.

At block 210 the machine learning module 113 generates candidate function data including, for each data field of the new form, a plurality of candidate functions for providing the expected data value for the data field, according to one embodiment. From block 210 the process proceeds to block 212.

At block 212 the machine learning module 113 generates test data by applying the candidate functions to the training set data, according to one embodiment. From block 212 the process proceeds to block 214.

At block 214 the machine learning module 113 generates matching data indicating how closely each candidate function matches the test data, according to one embodiment. From block 214 the process proceeds to block 216.

At block 216, the machine learning module 113 identifies a respective acceptable function for each data field of the new form based on the matching data. From block 212 the process proceeds to block 218.

At block 218 the machine learning module 113 generates results data indicating an acceptable function for each data field of the new form, according to one embodiment. From block 218 the process proceeds to block 220.

At block 220, the interface module 112 outputs the results data for review by an expert or other personnel, according to one embodiment.

Although a particular sequence is described herein for the execution of the process 200, other sequences can also be implemented. For example, the data acquisition module can gather training set data each time a new data field of the new form as to be learned. The machine learning module 113 can generate a single candidate function at a time and can generate test data and matching data for that candidate function and determine if the candidate function is correct based on the matching data. If the candidate function is not correct, the machine learning module 113 returns to step 210 and generates a new candidate function. The grouping module 115 and the sampling module 116 can generate grouping data and sampling data for each selected data field of a new form. The process can repeat until an acceptable function has been found for the data field currently being learned. When an acceptable function is found for a particular data field, the data acquisition module can again gather training set data for the next data field and the machine learning module 113 can generate, test, and analyze candidate functions until an acceptable function has and found. The machine learning module can generate candidate functions based on dependency data that indicates one or more possible dependencies for an acceptable function a given data field. The grouping module 115 can generate grouping data based on the one or more possible dependencies and the data values related to those dependencies in the training set data. The machine learning module 113 can generate candidate functions by selecting one or more operators from a library of operators. In one embodiment, at step 208 the sampled training set data, as indicated by the sampling data, can be provided to the quality assurance system 118 instead of, or in addition to, the machine learning module 113. Other sequences can also be implemented.

Figure 3:
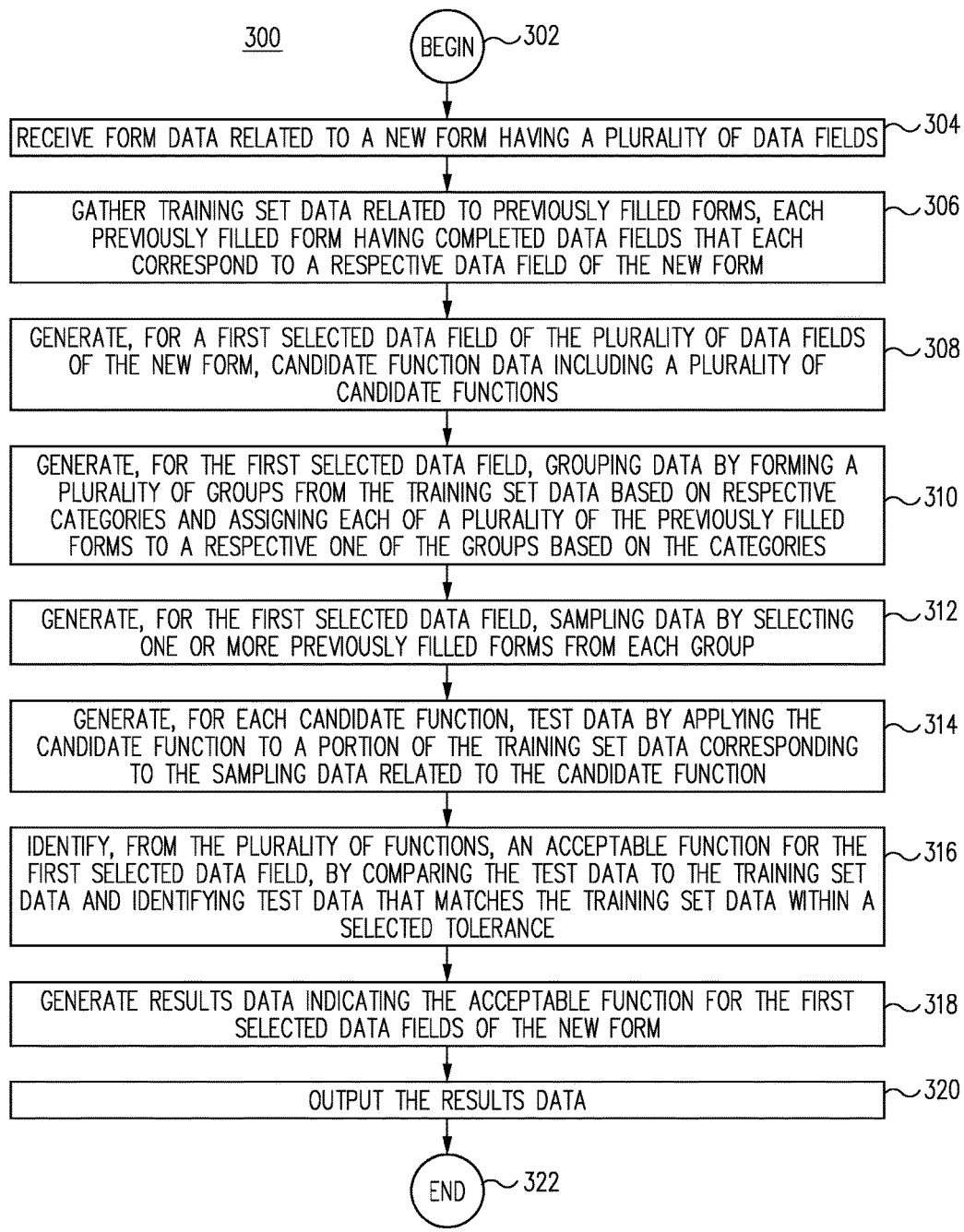
FIG. 3 is a flow diagram of a process for efficiently learning new forms in an electronic document preparation system, in accordance with one embodiment.

FIG. 3 illustrates a flow diagram of a process 300 for efficiently learning new forms in an electronic document preparation system, according to various embodiments.

In one embodiment, process 300 for efficiently learning new forms in an electronic document preparation system begins at BEGIN 302 and process flow proceeds to RECEIVE FORM DATA RELATED TO A NEW FORM HAVING A PLURALITY OF DATA FIELDS 304.

In one embodiment, at RECEIVE FORM DATA RELATED TO A NEW FORM HAVING A PLURALITY OF DATA FIELDS 304 process 300 for efficiently learning new forms in an electronic document preparation system receives form data related to a new form having a plurality of data fields.

In one embodiment, once process 300 for efficiently learning new forms in an electronic document preparation system receives form data related to a new form having a plurality of data fields at RECEIVE FORM DATA RELATED TO A NEW FORM HAVING A PLURALITY OF DATA FIELDS 304 process flow proceeds to GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306.

In one embodiment, at GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306, process 300 for efficiently learning new forms in an electronic document preparation system gathers training set data related to previously filled forms, each previously filled form having completed data fields that each correspond to a respective data field of the new form.

In one embodiment, once process 300 for efficiently learning new forms in an electronic document preparation system gathers training set data related to previously filled forms, each previously filled form having completed data fields that each correspond to a respective data field of the new form at GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306, process flow proceeds to GENERATE, FOR A FIRST SELECTED DATA FIELD OF THE PLURALITY OF DATA FIELDS OF THE NEW FORM, CANDIDATE FUNCTION DATA INCLUDING A PLURALITY OF CANDIDATE FUNCTIONS 308.

In one embodiment, at GENERATE, FOR A FIRST SELECTED DATA FIELD OF THE PLURALITY OF DATA FIELDS OF THE NEW FORM, CANDIDATE FUNCTION DATA INCLUDING A PLURALITY OF CANDIDATE FUNCTIONS 308, process 300 for efficiently learning new forms in an electronic document preparation system generates, for a first selected data field of the plurality of data fields of the new form, candidate function data including a plurality of candidate functions.

In one embodiment, once process 300 for efficiently learning new forms in an electronic document preparation system generates, for a first selected data field of the plurality of data fields of the new form, candidate function data including a plurality of candidate functions at GENERATE, FOR A FIRST SELECTED DATA FIELD OF THE PLURALITY OF DATA FIELDS OF THE NEW FORM, CANDIDATE FUNCTION DATA INCLUDING A PLURALITY OF CANDIDATE FUNCTIONS 308, process flow proceeds to GENERATE, FOR THE FIRST SELECTED DATA FIELD, GROUPING DATA BY FORMING A PLURALITY OF GROUPS FROM THE TRAINING SET DATA BASED ON RESPECTIVE CATEGORIES AND ASSIGNING EACH OF A PLURALITY OF THE PREVIOUSLY FILLED FORMS TO A RESPECTIVE ONE OF THE GROUPS BASED ON THE CATEGORIES 310.

In one embodiment, at GENERATE, FOR THE FIRST SELECTED DATA FIELD, GROUPING DATA BY FORMING A PLURALITY OF GROUPS FROM THE TRAINING SET DATA BASED ON RESPECTIVE CATEGORIES AND ASSIGNING EACH OF A PLURALITY OF THE PREVIOUSLY FILLED FORMS TO A RESPECTIVE ONE OF THE GROUPS BASED ON THE CATEGORIES 310, process 300 for efficiently learning new forms in an electronic document preparation system generates, for the first selected data field, grouping data by forming a plurality of groups from the training set data based on respective categories and assigning each of a plurality of the previously filled forms to a respective one of the groups based on the categories, according to one embodiment.

In one embodiment, once process 300 for efficiently learning new forms in an electronic document preparation system generates, for the first selected data field, grouping data by forming a plurality of groups from the training set data based on respective categories and assigning each of a plurality of the previously filled forms to a respective one of the groups based on the categories at GENERATE, FOR THE FIRST SELECTED DATA FIELD, GROUPING DATA BY FORMING A PLURALITY OF GROUPS FROM THE TRAINING SET DATA BASED ON RESPECTIVE CATEGORIES AND ASSIGNING EACH OF A PLURALITY OF THE PREVIOUSLY FILLED FORMS TO A RESPECTIVE ONE OF THE GROUPS BASED ON THE CATEGORIES 310, process flow proceeds to GENERATE, FOR THE FIRST SELECTED DATA FIELD, SAMPLING DATA BY SELECTING ONE OR MORE PREVIOUSLY FILLED FORMS FROM EACH GROUP 312.

In one embodiment, at GENERATE, FOR THE FIRST SELECTED DATA FIELD, SAMPLING DATA BY SELECTING ONE OR MORE PREVIOUSLY FILLED FORMS FROM EACH GROUP 312 the process 300 generates, for the first selected data field, sampling data by selecting one or more previously filled forms from each group.

In one embodiment, once process 300 generates, for the first selected data field, sampling data by selecting one or more previously filled forms from each group at GENERATE, FOR THE FIRST SELECTED DATA FIELD, SAMPLING DATA BY SELECTING ONE OR MORE PREVIOUSLY FILLED FORMS FROM EACH GROUP 312, process flow proceeds to GENERATE, FOR EACH CANDIDATE FUNCTION, TEST DATA BY APPLYING THE CANDIDATE FUNCTION TO A PORTION OF THE TRAINING SET DATA CORRESPONDING TO THE SAMPLING DATA RELATED TO THE CANDIDATE FUNCTION 314.

In one embodiment, at GENERATE, FOR EACH CANDIDATE FUNCTION, TEST DATA BY APPLYING THE CANDIDATE FUNCTION TO A PORTION OF THE TRAINING SET DATA CORRESPONDING TO THE SAMPLING DATA RELATED TO THE CANDIDATE FUNCTION 314 the process 300 for efficiently learning new forms in an electronic document preparation system generates, for each candidate function, test data by applying the candidate function to a portion of the training set data corresponding to the sampling data related to the candidate function.

In one embodiment, once the process 300 for efficiently learning new forms in an electronic document preparation system generates, for each candidate function, test data by applying the candidate function to a portion of the training set data corresponding to the sampling data related to the candidate function at GENERATE, FOR EACH CANDIDATE FUNCTION, TEST DATA BY APPLYING THE CANDIDATE FUNCTION TO A PORTION OF THE TRAINING SET DATA CORRESPONDING TO THE SAMPLING DATA RELATED TO THE CANDIDATE FUNCTION 314, process flow proceeds to IDENTIFY, FROM THE PLURALITY OF FUNCTIONS, AN ACCEPTABLE FUNCTION FOR THE FIRST SELECTED DATA FIELD, BY COMPARING THE TEST DATA TO THE TRAINING SET DATA AND IDENTIFYING TEST DATA THAT MATCHES THE TRAINING SET DATA WITHIN A SELECTED TOLERANCE 316.

In one embodiment, at IDENTIFY, FROM THE PLURALITY OF FUNCTIONS, AN ACCEPTABLE FUNCTION FOR THE FIRST SELECTED DATA FIELD, BY COMPARING THE TEST DATA TO THE TRAINING SET DATA AND IDENTIFYING TEST DATA THAT MATCHES THE TRAINING SET DATA WITHIN A SELECTED TOLERANCE 316 the process 300 for efficiently learning new forms in an electronic document preparation system identifies, from the plurality of functions, an acceptable candidate for the first selected data field, by comparing the test data to the training set data and identifying test data that matches the training set data within a selected tolerance.

In one embodiment, once the process 300 for efficiently learning new forms in an electronic document preparation system identifies, from the plurality of functions, an acceptable candidate for the first selected data field, by comparing the test data to the training set data and identifying test data that matches the training set data within a selected tolerance at IDENTIFY, FROM THE PLURALITY OF FUNCTIONS, AN ACCEPTABLE FUNCTION FOR THE FIRST SELECTED DATA FIELD, BY COMPARING THE TEST DATA TO THE TRAINING SET DATA AND IDENTIFYING TEST DATA THAT MATCHES THE TRAINING SET DATA WITHIN A SELECTED TOLERANCE 316, process flow proceeds to GENERATE RESULTS DATA INDICATING THE ACCEPTABLE FUNCTION FOR THE FIRST SELECTED DATA FIELD OF THE NEW FORM 318.

In one embodiment, at GENERATE RESULTS DATA INDICATING THE ACCEPTABLE FUNCTION FOR THE FIRST SELECTED DATA FIELD OF THE NEW FORM 318, the process 300 for efficiently learning new forms in an electronic document preparation system generates results data indicating an acceptable function for the first selected data field of the new form.

In one embodiment, once the process 300 for efficiently learning new forms in an electronic document preparation system generates results data indicating an acceptable function for the first data field of the new form at GENERATE RESULTS DATA INDICATING THE ACCEPTABLE FUNCTION FOR THE FIRST SELECTED DATA FIELD OF THE NEW FORM 318 proceeds to OUTPUT THE RESULTS DATA 320.

In one embodiment, at OUTPUT THE RESULTS DATA 320 the process 300 for efficiently learning new forms in an electronic document preparation system outputs the results data.

In one embodiment, once the process 300 for efficiently learning new forms in an electronic document preparation system outputs the results data at OUTPUT THE RESULTS DATA 320, process flow proceeds to END 322.

In one embodiment, at END 322 the process for efficiently learning new forms in an electronic document preparation system is exited to await new data or instructions.

Figure 4:
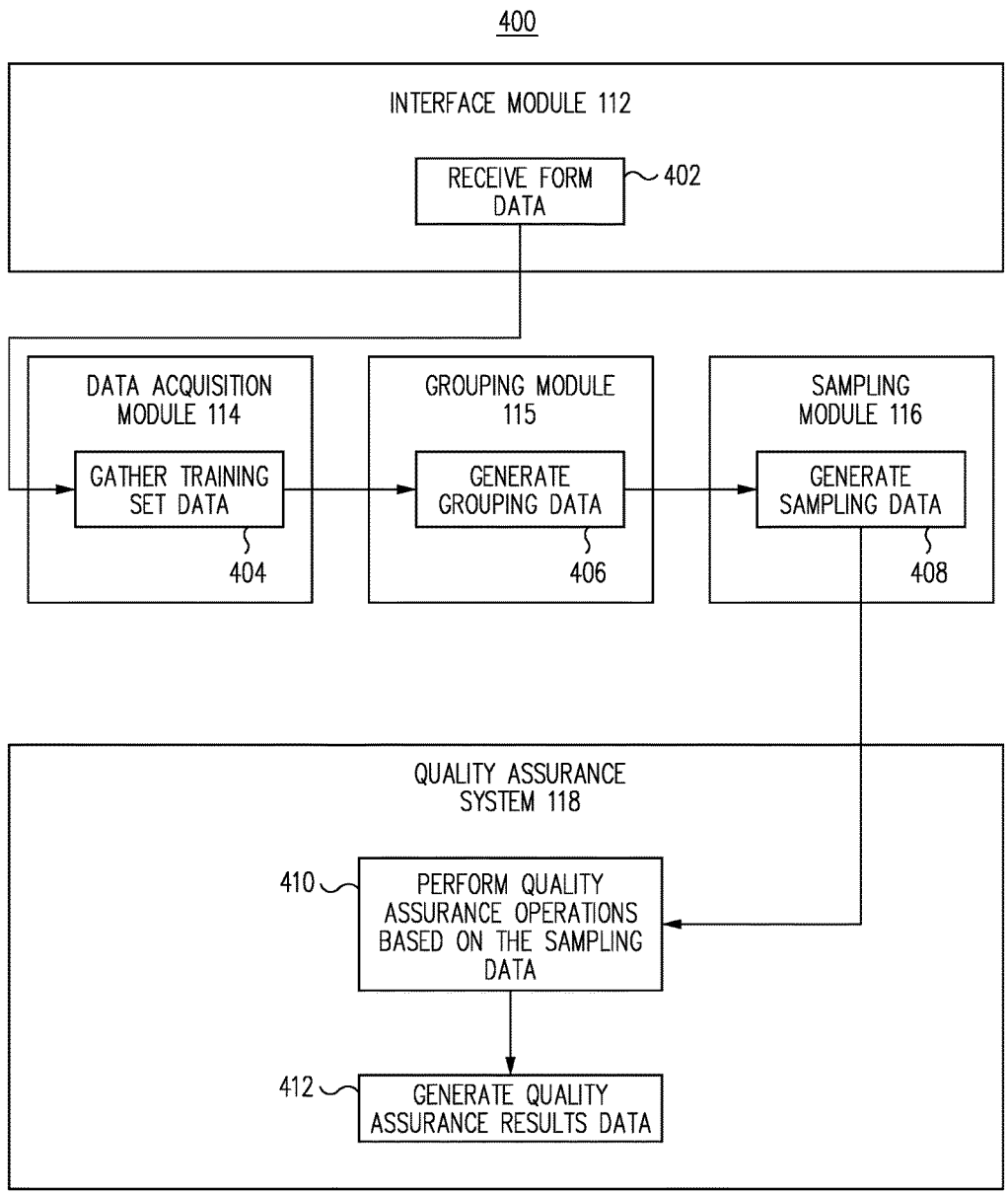
FIG. 4 is a block diagram of a process for grouping and sampling training set data for quality assurance purposes, in accordance with one embodiment.

FIG. 4 illustrates a functional flow diagram of a process 400 for grouping and sampling training set data for quality assurance purposes, in accordance with one embodiment.

At block 402 the interface module 112 receives form data related to a new form having a plurality of data fields that expect data values in accordance with specific functions, according to one embodiment. From block 402 the process proceeds to block 404.

At block 404 the data acquisition module 114 gathers training set data related to previously filled forms having completed data fields that each correspond to a respective data field of the new form, according to one embodiment. From block 404 the process proceeds to block 406.

At block 406 the grouping module 115 generates grouping data by assigning each of a plurality of previously filled forms from the training set data to groups, according to one embodiment. From block 406 the process proceeds to block 408.

At block 408 the sampling module 116 generates sampling data by selecting one or more previously filled forms from each of the groups, according to one embodiment. From block 408 the process proceeds to block 410.

At block 410 the quality assurance module 118 performs quality assurance operations based on the sampling data. The quality assurance operations can be performed to test the reliability of an electronic document preparation system or type of data processing system. From block 410, the process proceeds to block 412.

At block 412 the quality assurance module 118 generates quality assurance results data indicating the quality or reliability of the electronic document preparation system or other data processing system, according to an embodiment.

Although a particular sequence is described herein for the execution of the process 400, other sequences can also be implemented. For example, the training set data can be gathered based on dependency data related to one or more dependencies of the data fields of the new form.

As noted above, the specific illustrative examples discussed above are but illustrative examples of implementations of embodiments of the method or process for efficiently learning new forms in an electronic document preparation system. Those of skill in the art will readily recognize that other implementations and embodiments are possible. Therefore, the discussion above should not be construed as a limitation on the claims provided below.

In one embodiment, a computing system implemented method for efficiently learns new forms in an electronic document preparation system. The method receiving form data related to a new form having a plurality of data fields, gathering training set data related to previously filled forms, each previously filled form having completed data fields that each correspond to a respective data field of the new form, and generating, for a first selected data field of the plurality of data fields of the new form, candidate function data including a plurality of candidate functions. The method also includes generating, for the first selected data field, grouping data by forming a plurality of groups from the training set data based on respective categories and assigning each of a plurality of the previously filled forms to a respective one of the groups based on the categories, generating, for the first selected data field, sampling data by selecting one or more previously filled forms from each group, and generating, for each candidate function, test data by applying the candidate function to a portion of the training set data corresponding to the sampling data related to the candidate function. The method also includes identifying, from the plurality of functions, an acceptable candidate for the first selected data field by comparing the test data to the training set data and identifying test data that matches the training set data within a selected tolerance and generating and outputting results data indicating the acceptable function for the first data field of the new form.

One embodiment is a non-transitory computer-readable medium having a plurality of computer-executable instructions which, when executed by a processor, perform a method for efficiently learning new forms in an electronic document preparation system. The instructions include an interface module configured to receive form data representing to a new form having a plurality of data fields and a data acquisition module configured to gather training set data related to previously filled forms, each previously filled form having completed data fields that each correspond to a respective data field of the new form. The instructions also include a grouping module configured to generate, for each selected data field of the new form, grouping data by forming a plurality of groups from the training set data based on respective categories and assigning each of a plurality of the previously filled forms to a respective one of the groups. The instructions also include a sampling module configured to generate, for each selected data field of the new form, sampling data by selecting one or more previously filled forms from each group of the grouping data associated with the selected data field. The instructions also include a machine learning module configured to generate, for each selected data field, candidate function data relating to a plurality of candidate functions, to generate, for each selected data field, test data by applying the candidate functions to the training set data in accordance with the sampling data, and to identify, for each selected data field, an acceptable function from the plurality of candidate functions based on a how closely the test data matches the candidate function data.

One embodiment is a computing system implemented method for grouping and sampling data sets. The method includes gathering training set data related to previously filled forms each having a plurality of data fields and generating, for a first selected data field of the plurality of data fields, grouping data by forming a plurality of groups from the training set data based on respective categories and assigning each of a plurality of the previously filled forms to a respective one of the groups based on the categories. The method also includes generating, for the first selected data field, sampling data by selecting one or more previously filled forms from each group. The groups are selected to ensure that the sampling data will include previously filled forms having uncommon data values in data fields corresponding to the selected data field or in data fields included in one or more of the candidate functions. The method also includes providing a portion of the training set data corresponding to the sampling data to a quality assurance system.

A system for efficiently learning new forms in an electronic document preparation system. The system includes at least one processor and at least one memory coupled to the at least one processor, the at least one memory having stored therein instructions which, when executed by any set of the one or more processors, perform a process. The process includes receiving, with an interface module of a computing system, form data related to a new form having a plurality of data fields, gathering, with a data acquisition module of a computing system, training set data related to previously filled forms, each previously filled form having completed data fields that each correspond to a respective data field of the new form, and generating, with a grouping module of a computing system and for a first selected data field of the new form, grouping data by forming a plurality of groups from the training set data based on respective categories and assigning each of a plurality of the previously filled forms to a respective one of the groups. The process also includes generating, with a sampling module of a computing system, sampling data by selecting one or more previously filled forms from each group, generating, with a machine learning module of a computing system, for the first selected data field, candidate function data including a plurality of candidate functions, and generating, with the machine learning module and for each candidate function, test data by applying the candidate function to a portion of the training set data corresponding to the sampling data. The process also includes identifying, with the machine learning module and from the plurality of functions, an acceptable candidate for the first selected data field, by comparing the test data to the training set data and identifying test data that matches the training set data within a selected tolerance. The process also includes generating, with the machine learning module, results data indicating the acceptable function for the first data field of the new form and outputting, with the interface module the results data.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for efficiently learning new forms in an electronic document preparation system, the method comprising:
    receiving form data related to a new form having a plurality of data fields;
    gathering training set data related to previously filled forms, each previously filled form having one or more completed data fields that correspond to a respective data field of the new form;
    deleting from the training set data one or more sets of data of a previously filled form where a first set of data of the previously filled form matched a second set of data of the previously filled form and the deleted training set data includes the second set of data;
    generating, for a first selected data field, dependency data indicating one or more possible dependencies for an acceptable function, the possible dependencies including one or more data fields of the new form other than the first selected data field, the possible dependencies further including one or more constants of the first selected data field, the possible dependencies further including one or more values of data fields from a form other than the new form;
    generating, for a first selected data field of the plurality of data fields of the new form and based on the dependency data, candidate function data including a plurality of candidate functions;
    generating, for the first selected data field and based on the dependency data, grouping data by forming a plurality of groups from the training set data based on respective categories and assigning each of a plurality of the previously filled forms to a respective one of the groups based on the categories;
    generating, for the first selected data field, sampling data by selecting one or more previously filled forms from each group;
    generating, for each candidate function, test data by applying the candidate function to a portion of the training set data corresponding to the sampling data related to the candidate function;
    identifying one or more candidate functions of the plurality of candidate functions that have associated test data that are a best match to the training set data as compared with other candidate functions of the plurality of candidate functions;
    generating one or more additional candidate functions, the additional candidate functions being based on the identified one or more candidate functions that have associated test data that are a best match;
    repeatedly identifying generated candidate functions that have associated test data that are a best match to the training set data and generating one or more additional candidate functions, the additional candidate functions being based on the identified one or more candidate functions that have associated test data that are a best match until one or more candidate functions are determined to have associated test data that matches the training set data with a predetermined tolerance;
    identifying, from the plurality of candidate functions, an acceptable function for the first selected data field by comparing the test data to the training set data and identifying test data that matches the training set data within a predetermined tolerance, the identified acceptable function being a candidate function associated with the matching test data; and
    generating and outputting results data indicating the acceptable function for the first data field of the new form.

2. The method of claim 1, wherein the possible dependencies include one or more of:
    a data field from the new form;
    a data field from one or more forms other than the new form; and
    a constant.

3. The method of claim 2, wherein generating grouping data includes:
    identifying previously filled forms having identical combinations of data values in data fields related to the dependency data; and
    excluding from the groups previously filled forms having identical combinations of data values in data fields related to the dependency data.

4. The method of claim 3, wherein the data fields related to the dependency data include data fields of the previously filled forms that correspond to the first selected data field.

5. The method of claim 3 wherein the data fields related to the dependency data include data fields from the previously filled forms or from other forms or worksheets related to the previously filled forms.

6. The method of claim 5, wherein the groups are based on respective signs of data values in data fields related to the dependency data.

7. The method of claim 5, wherein the groups are based on magnitudes of data values in data fields related to the dependency data.

8. The method of claim 5, wherein the groups are based on relationships of one or more constants to data values in data fields related to the dependency data.

9. The method of claim 5, wherein the groups are based on one or of magnitudes of data values in data fields related to the dependency data, signs of data values in data fields related to the dependency data, and a relationship of one or more constants to data values in data fields related to the dependency data.

10. The method of claim 1, wherein the groups are selected to ensure that the sampling data will include previously filled forms having extreme data values in data fields corresponding to the selected data field or in data fields included in one or more of the candidate functions.

11. The method of claim 1, further comprising, after identifying the acceptable function for the first selected data field of the new form, identifying a second acceptable function for a second selected data field from the plurality of data fields of the new form.

12. The method of claim 11, further comprising:
generating, for the second selected data field, grouping data by forming a plurality of groups from the training set data based on respective categories and assigning each of a plurality of the previously filled forms to one of the groups based on the categories;
generating second sampling data by selecting one or more previously filled forms from each group;
generating, for the second selected data field, second candidate function data including a plurality of second candidate functions;
generating, for each second candidate function, second test data by applying the second candidate function to a portion of the training set data corresponding to the second sampling data;
identifying, from the plurality of functions, the second correct candidate function for the second selected data field, by comparing the second test data to the training set data and identifying second test data that matches the training set data within a selected tolerance; and
generating and outputting second results data indicating the second acceptable function for the second selected data field of the new form.

13. The method of claim 1, wherein the new form is a finance related form and the training set data includes historical financial data related to previously prepared financial documents, the historical financial data including the previously filled forms.

14. The method of claim 13, wherein the historical financial data includes previously prepared financial documents that were previously filed with a government or financial institution.

15. The method of claim 1, wherein the training set data includes fabricated data related to fabricated documents, the fabricated data including the previously filled forms.

16. The method of claim 15, further comprising receiving the fabricated financial data from one or more third parties.

17. The method of claim 1, wherein the candidate functions each include one or more operators from a library of operators including:

an addition operator;
a subtraction operator;
a division operator;
a multiplication operator;
an exponential operator;
logical operators;
a string comparison operator; and
existence condition operators.

18. The method of claim 1, wherein the new form is a new tax form and the training set data includes previously prepared tax returns.

19. A system for efficiently learning new forms in an electronic document preparation system, the system comprising:
at least one processor; and
at least one memory coupled to the at least one processor, the at least one memory having stored therein instructions which, when executed by any set of the at least one processors, perform a process including:
receiving, with an interface module of a computing system, form data related to a new form having a plurality of data fields;
gathering, with a data acquisition module of a computing system, training set data related to previously filled forms, each previously filled form having completed data fields that each correspond to a respective data field of the new form;
deleting from the training set data one or more sets of data of a previously filled form where a first set of data of the previously filled form matched a second set of data of the previously filled form and the deleted training set data includes the second set of data;
generating, for a first selected data field, dependency data indicating one or more possible dependencies for an acceptable function, the possible dependencies including one or more data fields of the new form other than the first selected data field, the possible dependencies further including one or more constants of the first selected data field, the possible dependencies further including one or more values of data fields from a form other than the new form;
generating, with a grouping module of a computing system and for a first selected data field of the new form and based on the dependency data, grouping data by forming a plurality of groups from the training set data based on respective categories and assigning each of a plurality of the previously filled forms to a respective one of the groups;
generating, with a sampling module of a computing system, sampling data by selecting one or more previously filled forms from each group;
generating, with a machine learning module of a computing system, for the first selected data field and based on the dependency data, candidate function data including a plurality of candidate functions;
generating, with the machine learning module and for each candidate function, test data by applying the candidate function to a portion of the training set data corresponding to the sampling data;
identifying one or more candidate functions of the plurality of candidate functions that have associated test data that are a best match to the training set data as compared with other candidate functions of the plurality of candidate functions;
generating one or more additional candidate functions, the additional candidate functions being based on the identified one or more candidate functions that have associated test data that are a best match;

repeatedly identifying generated candidate functions that have associated test data that are a best match to the training set data and generating one or more additional candidate functions, the additional candidate functions being based on the identified one or more candidate functions that have associated test data that are a best match until one or more candidate functions are determined to have associated test data that matches the training set data with a predetermined tolerance;

identifying, with the machine learning module and from the plurality of candidate functions, an acceptable candidate for the first selected data field, by comparing the test data to the training set data and identifying test data that matches the training set data within a predetermined tolerance, the identified acceptable function being a candidate function associated with the matching test data;

generating, with the machine learning module, results data indicating the acceptable function for the first data field of the new form; and outputting, with the interface module, the results data.

20. The system of claim 19, wherein generating grouping data includes:

identifying previously filled forms that are identical to each other in selected areas; and discarding from consideration the previously filled forms that are identical in the selected areas.

21. The system of claim 20, wherein the selected areas are data fields of the previously filled forms that are related to the first selected data field.

22. The system of claim 21, wherein the process further includes generating, for a first selected data field of the plurality of data fields of the new form, dependency data indicating one or more possible dependencies for the acceptable function.

23. The system of claim 22, wherein the possible dependencies include one or more of:

a data field from the new form;

multiple data fields from the new form;

a data field from a form other than a new form;

multiple data fields from multiple forms other than the new form; and a constant.

24. The system of claim 22, wherein the dependency data indicates multiple data fields from the previously filled forms or from other forms or worksheets related to the previously filled forms.

25. The system of claim 24, wherein the groups are based on respective signs of data values in the multiple data fields.

26. The system of claim 24, wherein the groups are based on magnitudes of data values in the multiple data fields.

27. The system of claim 24, wherein the groups are based on both magnitudes and signs of data values in the multiple data fields.

28. The system of claim 19, wherein generating the sampling data includes selecting from each group a selected number of previously filled forms.

29. The system of claim 19, wherein the groups are selected to ensure that the sampling data will include previously filled forms having extreme data values in data fields corresponding to the selected data field or in data fields included in one or more of the candidate functions.

30. The system of claim 19, wherein the process further includes, after identifying the acceptable function for the first selected data field of the new form, identifying a second acceptable function for a second selected data field from the plurality of data fields of the new form.

31. The system of claim 30, wherein the process further includes:

generating, for the second selected data field, grouping data by forming a plurality of groups from the training set data based on respective categories and assigning each of a plurality of the previously filled forms to one of the groups;

generating second sampling data by selecting one or more previously filled forms from each group;

generating, for the second selected data field, second candidate function data including a plurality of second candidate functions;

generating, for each second candidate function, second test data by applying the second candidate function to a portion of the training set data corresponding to the second sampling data;

identifying, from the plurality of functions, the second correct candidate function for the second selected data field, by comparing the second test data to the training set data and identifying second test data that matches the training set data within a selected tolerance;

generating second results data indicating the second acceptable function for the second selected data field of the new form; and outputting the second results data.

* * * * *